(12) United States Patent
Fujiwara et al.

(10) Patent No.: US 7,719,515 B2
(45) Date of Patent: May 18, 2010

(54) INPUT DEVICE AND I/O-INTEGRATED DISPLAY

(75) Inventors: Koji Fujiwara, Tenri (JP); Naoto Inoue, Shiki-gun (JP); Tomohiko Yamamoto, Nara (JP); Keiichi Tanaka, Tenri (JP); Hideki Ichioka, Nabari (JP)

(73) Assignee: Sharp Kabushiki Kaisha, Osaka (JP)

( * ) Notice: Subject to any disclaimer, the term of this patent is extended or adjusted under 35 U.S.C. 154(b) by 1619 days.

(21) Appl. No.: 10/417,160

(22) Filed: Apr. 17, 2003

(65) Prior Publication Data

US 2003/0197691 A1 Oct. 23, 2003

(30) Foreign Application Priority Data

Apr. 19, 2002 (JP) ............................. 2002-118502
Jan. 31, 2003 (JP) ............................. 2003-024900

(51) Int. Cl.
*G09G 5/00* (2006.01)
*G06F 3/041* (2006.01)
*G06F 3/037* (2006.01)
(52) U.S. Cl. ...................... 345/156; 345/173; 345/181
(58) Field of Classification Search ......... 345/156–181; 178/18–19
See application file for complete search history.

(56) References Cited

U.S. PATENT DOCUMENTS 5,894,304 A * 4/1999 Hirano ..................... 345/179

FOREIGN PATENT DOCUMENTS

JP 7-64704 3/1995

* cited by examiner

*Primary Examiner*—Duc Q Dinh
(74) *Attorney, Agent, or Firm*—Birch, Stewart, Kolasch & Birch, LLP

(57) ABSTRACT

The invention concerns an input device including an input receiving panel and a stylus enabling an input, the input device sensing an input by means of capacitive coupling between a panel electrode on the input receiving panel and a stylus electrode on the stylus, and includes: a signal supply section supplying an input sensing signal to the panel electrode; a signal detecting circuit detecting a signal generated in the stylus electrode; and an input sensing section comparing the input sensing signal with the detection signal detected by the signal detecting circuit and sensing an input based on a result of the comparison. An input-sensing digital code is superimposed on the input sensing signal. This allows for further reduction in the possibility of false sensing caused by noise than conventional techniques.

38 Claims, 30 Drawing Sheets

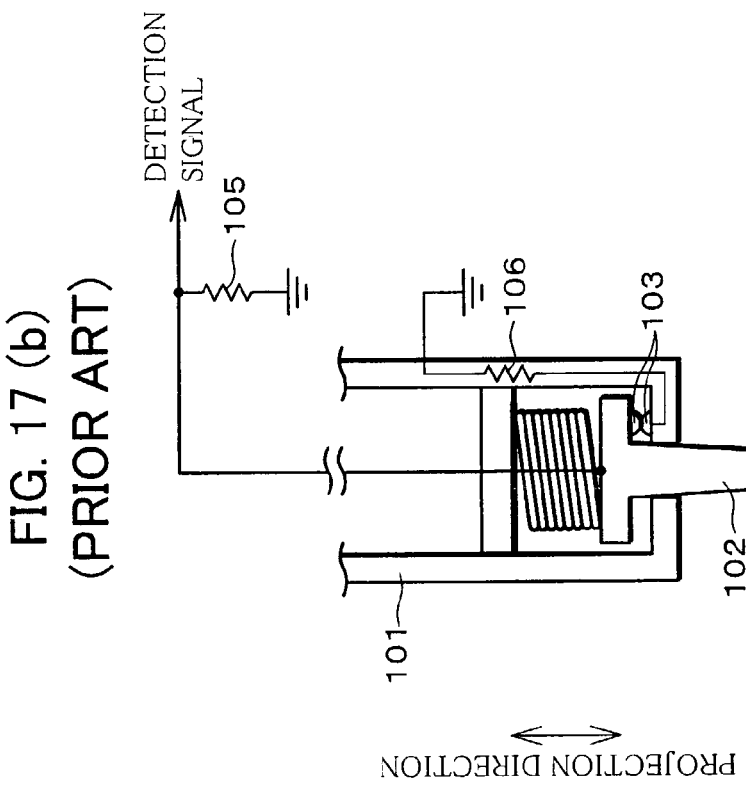
FIG. 17 (a) (PRIOR ART)
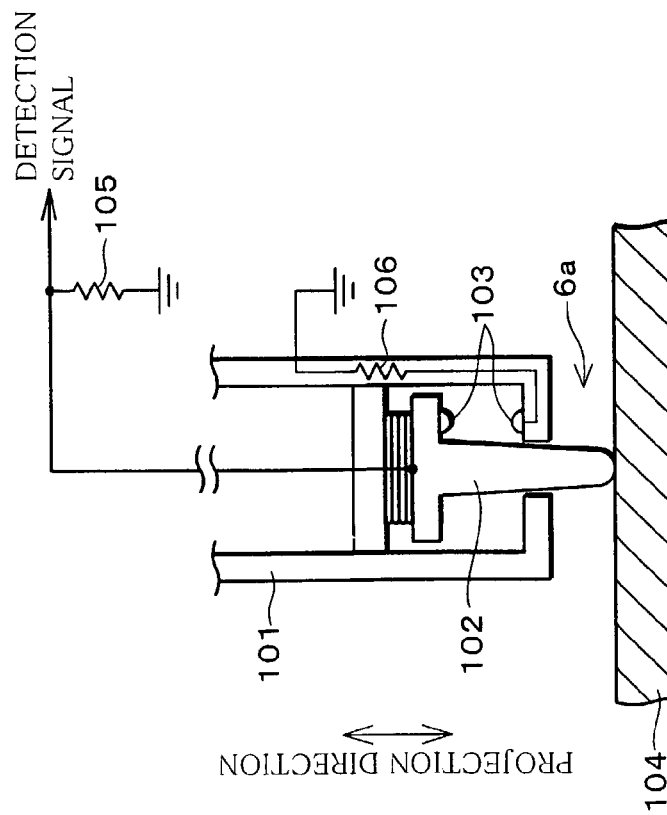
FIG. 17 (b) (PRIOR ART)

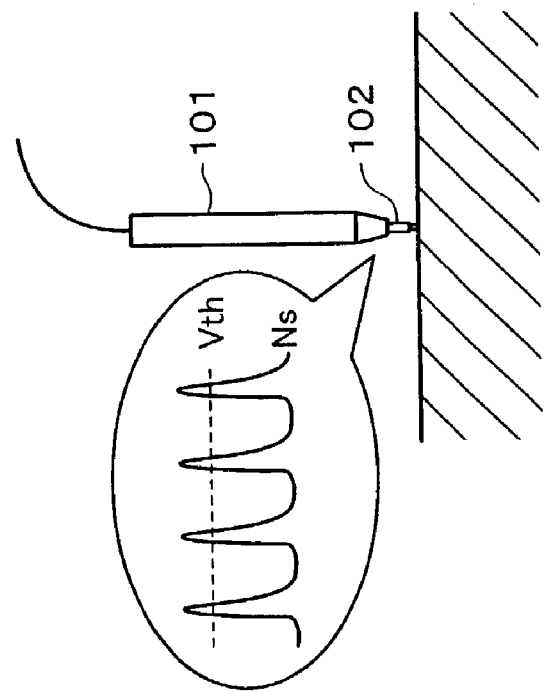
FIG. 18 (b) (PRIOR ART)
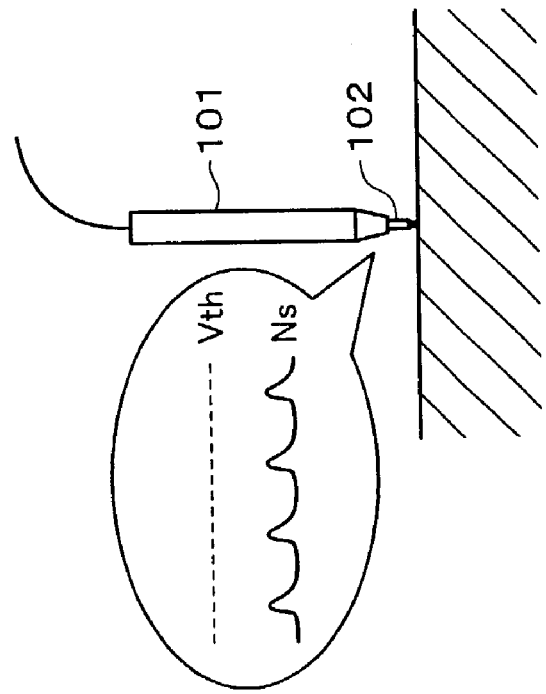
FIG. 18 (a) (PRIOR ART)

FIG. 25
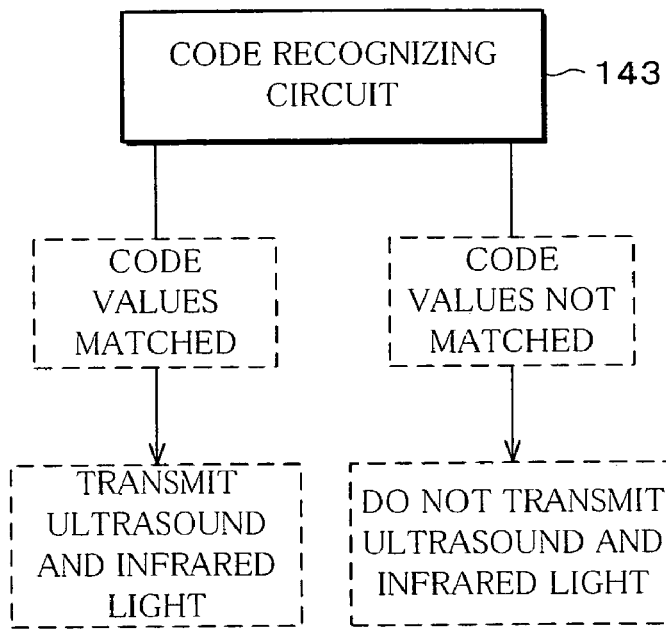
FIG. 26 (a)   FIG. 26 (a)
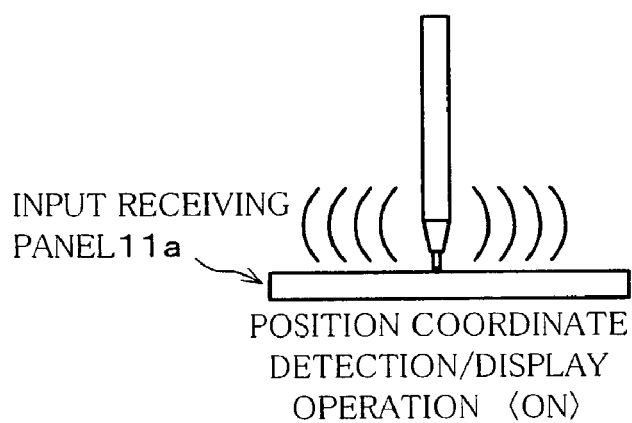
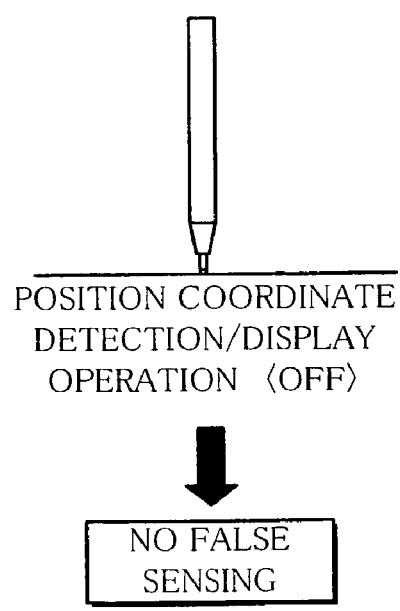

INFRARED TRANSMISSION WAVEFORM/INFRARED RECEPTION WAVEFORM (DIGITAL)

ULTRASOUND RECEPTION WAVEFORM (DIGITAL)

DIFFERENCE IN TRAVELING TIME

FIG. 33 (a)
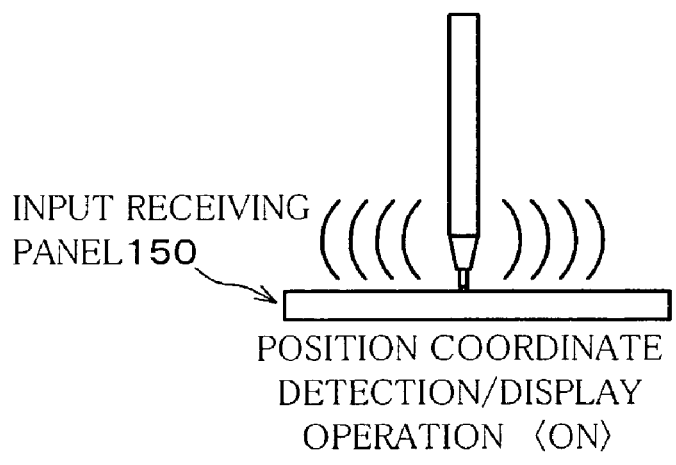
INPUT RECEIVING PANEL 150
POSITION COORDINATE DETECTION/DISPLAY OPERATION ⟨ON⟩
FIG. 33 (b)
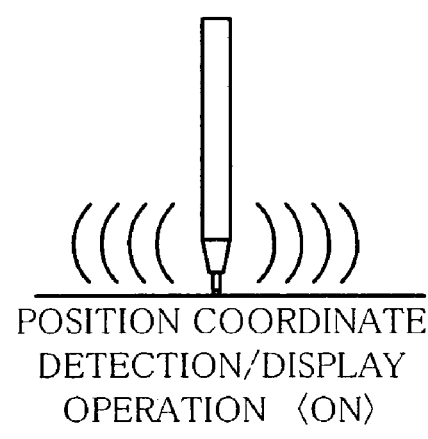
POSITION COORDINATE DETECTION/DISPLAY OPERATION ⟨ON⟩
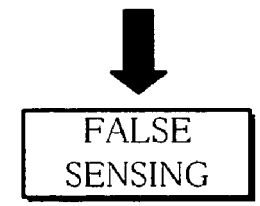
FALSE SENSING

INPUT DEVICE AND I/O-INTEGRATED DISPLAY

FIELD OF THE INVENTION

The present invention relates to an input device and an I/O-integrated display, provided with an input receiving panel for receiving an external input and input means for enabling input on the input receiving panel, for enabling input when, for example, the user brings the input means into contact with the input receiving panel, and in particular, to an I/O-integrated display, in which an input receiving panel is built integrally with a display panel, for enabling input by determining the coordinates of the contact position of the input means on the display panel and an input device suitable used with the I/O-integrated display.

BACKGROUND OF THE INVENTION

Prior art I/O-integrated displays include those which enable input by means of capacitive coupling. In capacitive coupling, a signal is fed to a tablet electrode provided on a tablet as an input receiving panel. As the tablet electrode is capacitively coupled to a stylus electrode provided in an input stylus as input means, the stylus electrode detects the signal. Thus, an input, as well as its coordinates, is sensed.

In capacitive coupling, however, the stylus electrode picks up noise in some circumstances, falsely recognizing it as an input. Here does a problem arise that an input is falsely sensed with no actual input.

To address the problem, Japanese published unexamined patent application 7-64704/1995 (Tokukaihei 7-64704, published on Mar. 10, 1995) discloses a technique attempting to avoid false sensing: an input stylus 101 has a stylus electrode 102 which is provided movable in the projection directions and a switch 103 which is turns on/off in accordance with the movement of the stylus electrode 102, as illustrated in FIGS. 17(a) and 17(b).

According to the technique, the switch 103 is off (an input is being made; FIG. 17(a)) when the stylus electrode 102 is pressed to the tablet 104 and on (no input is being made; FIG. 17(b)) when the stylus electrode 102 is distanced from the tablet 104. When the switch 103 is off, the stylus electrode 102 has a high input impedance due to a high-impedance resistor 105; when the switch 103 is on, the stylus electrode 102 has a low input impedance due to a low-impedance resistor 106 being inserted.

Thus, when the switch 103 is off, a high voltage level signal is detected through the stylus electrode 102; when the switch 103 is on, a low voltage level signal is detected through the stylus electrode 102. Accordingly, with such a configuration that an input is sensible when the detected signal has a high voltage level and not sensible when it has a low voltage level, no input is sensed when the stylus electrode 102 is picking up noise at a distance from the tablet 104. The technique can thereby avoid false sensing.

According to the technique, however, the switch 103 is off also when the stylus electrode 102 is pressed to an object other than the tablet 104. If the stylus electrode 102 picks up noise in such a state, a false sensing occurs as it did with older techniques.

The application further discloses more accurately sensing an input through discrimination between a detection signal and noise by comparing the detection signal with a predetermined threshold voltage. This indeed prevents false sensing if detected noise Ns is weaker than a threshold voltage Vth as shown in FIG. 18(a), but fails to do so if the detected noise level Ns is greater than the threshold voltage Vth as shown in FIG. 18(b).

SUMMARY OF THE INVENTION

In view of these problems, the present invention has an objective to offer an input device which is less susceptible to noise-caused false sensing and an I/O-integrated display incorporating the input device.

To solve the problems, an input device in accordance with the present invention includes an input receiving panel for receiving an external input and an input section for enabling an input on the input receiving panel, the input device sensing an input by means of capacitive coupling between an electrode on the input receiving panel and an electrode on the input section, and is arranged so as to include: a first signal supply section for supplying an input sensing signal to a first one of the electrodes; a signal detecting section for detecting a signal generated in the other, second electrode; and an input sensing section for comparing the input sensing signal with the signal detected by the signal detecting section and sensing an input based on a result of the comparison.

According to the arrangement, the first signal supply section supplies an input sensing signal for input sensing purposes to the first electrode. In this circumstance, if the first and second electrodes are capacitively coupled, a signal in accordance with the input sensing signal supplied to the first electrode is induced in the second electrode. The signal detecting section detects signals generated in the second electrode, including the induced signal and signals caused by noise.

Now, if input sensing is based only on the signal detected by the signal detecting section, false sensing occurs due to noise as in conventional cases. In contrast, according to the arrangement, the input sensing section compares the input sensing signal supplied from the first signal supply section with the signal detected by the signal detecting section and senses an input based on a result of the comparison. For example, the input sensing section is enabled to sense an input if the result of the comparison can be interpreted as meaning that the input sensing signal is identical to the signal detected by the signal detecting section, and otherwise disabled to do so.

Therefore, by using as the input sensing signal such a signal that hardly occurs as noise, an input can be sensed practically only when a signal is sensed which is induced in the second electrode in accordance with the input sensing signal in response to, for example, a contact of the input section on the input receiving panel. The arrangement thus allows for further reduction in the possibility of false sensing caused by noise, in comparison to conventional technology.

To solve the problems, an input device in accordance with the present invention includes an input receiving panel for receiving an external input and an input section for enabling an input on the input receiving panel, the input device sensing an input by means of capacitive coupling between an electrode on the input receiving panel and an electrode on the input section, and is arranged so as to include: a first signal supply section for supplying an input sensing signal to a first one of the electrodes; a signal detecting section for detecting a signal generated in the other, second electrode; a signal generator section for generating another sensing signal which is an equivalent to the input sensing signal; and an input sensing section for comparing the other sensing signal with the signal detected by the signal detecting section and sensing an input based on a result of the comparison.

According to the arrangement, the first signal supply section supplies an input sensing signal for input sensing purposes to the first electrode. In this circumstance, if the first and second electrodes are capacitively coupled, a signal in accordance with the input sensing signal supplied to the first electrode is induced in the second electrode. The signal detecting section detects signals generated in the second electrode, including the induced signal and signals caused by noise. Further, the signal generator section generates another sensing signal equivalent to the input sensing signal.

Now, if input sensing is based only on the signal detected by the signal detecting section, false sensing occurs due to noise as in conventional cases. In contrast, according to the arrangement, the input sensing section compares the other sensing signal which is an equivalent to the input sensing signal with the signal detected by the signal detecting section and senses an input based on a result of the comparison. For example, the input sensing section is enabled to sense an input if the result of the comparison can be interpreted as meaning that the input sensing signal is identical to the other sensing signal, and otherwise disabled to do so.

Therefore, by using as the input sensing signal such a signal that hardly occurs as noise, an input can be sensed practically only when a signal is sensed which is induced in the second electrode in accordance with the input sensing signal in response to, for example, a contact of the input section on the input receiving panel. The arrangement thus allows for further reduction in the possibility of false sensing caused by noise, in comparison to conventional technology.

To solve the problems, an I/O-integrated display in accordance with the present invention is arranged so as to include the input device and produce a display on the input receiving panel.

In the I/O-integrated display, the input receiving panel may be fabricated separately from the display panel on which a display is produced for later integration or form a part of the display panel.

For a fuller understanding of the nature and advantages of the invention, reference should be made to the ensuing detailed description taken in conjunction with the accompanying drawings.

BRIEF DESCRIPTION OF DRAWINGS

FIGS. 17(a) and 17(b) are explanatory drawings illustrating a method of generating a detection signal in a conventional I/O-integrated display.

FIGS. 18(a) and 18(b) are explanatory drawings illustrating noise being detected in a conventional I/O-integrated display.

FIG. 25 is an explanatory drawing illustrating operation carried out by the code recognizing circuit in FIG. 22.

FIGS. 26(a), 26(b) are explanatory drawings, FIG. 26(a) illustrating a stylus switch in an on state on an input receiving panel of the I/O-integrated display in FIG. 19, FIG. 26(b) illustrating a stylus switch in on state on something other than the input receiving panel.

FIGS. 33(a), 33(b) are explanatory drawings, FIG. 33(a) illustrating a stylus switch in an on state on an input receiving panel of the ultrasound input device in FIG. 27 as the I/O-integrated display, FIG. 33(b) illustrating a stylus switch in an on state on something other than the input receiving panel of the ultrasound input device in FIG. 27 as the I/O-integrated display.

DETAILED DESCRIPTION OF THE INVENTION

The following will describe an embodiment in accordance with the present invention in reference to FIGS. 1-16 and 19-34.

Figure 1:
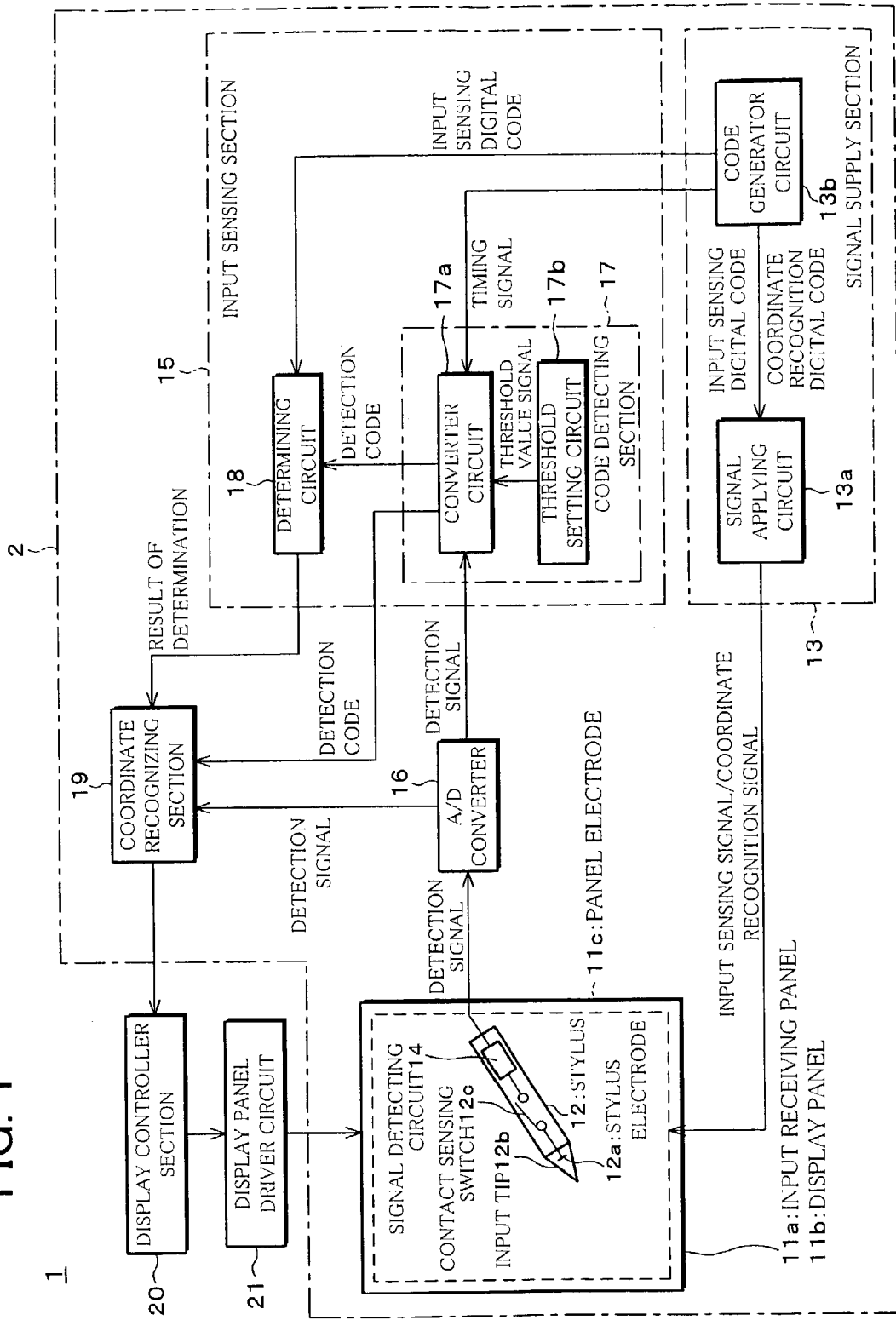
FIG. 1 is a block diagram showing a configuration of an I/O-integrated display of an embodiment in accordance with the present invention.

FIG. 1 schematically shows a configuration of an I/O-integrated display 1 of the present embodiment. The I/O-integrated display 1 is provided with an input device 2.

The input device 2 includes an input receiving panel 11a for receiving an external input and a stylus 12 (input means) enabling an input on the input receiving panel 11a. The input device 2 senses an input by means of capacitive coupling of a panel electrode (first electrode) 11c disposed over the input receiving panel 11a and a stylus electrode (second electrode) 12a disposed in the stylus 12.

The input device 2 further includes a signal supply section (first signal supply means) 13 supplying an input sensing signal to the panel electrode 11c, a signal detecting circuit (signal detecting means) 14 detecting a signal produced in the stylus electrode 12a, and an input sensing section (input sensing means) 15 sensing an input by means of the stylus 12 on the basis of a comparison of an input sensing signal with a detection signal detected by the signal detecting circuit 14. Details will be given below.

The input receiving panel 11a is constructed integrally with a display panel 11b, such as a liquid crystal panel, either passive or active, an organic EL panel, either passive or active, or a plasma display panel. The integral construction of the input receiving panel 11a and the display panel 11b may be achieved either by building the input receiving panel 11a as a part of the display panel 11b or combining the input receiving panel 11a and the display panel 11b which are initially fabricated separately.

The stylus 12 has an input tip 12b disposed at an end of it to come in contact with the input receiving panel 11a when an input is enabled, and a stylus electrode 12a disposed in or near the input tip 12b to form capacitive coupling with the panel electrode 11c when the input tip 12b is in contact with the input receiving panel 11a. The stylus 12 may include a contact sensing switch 12c as will be detailed later.

The signal supply section 13 includes a signal applying circuit 13a applying an input sensing signal, which is an analogue voltage signal, to the panel electrode 11c, and a code generator circuit 13b generating an input-sensing digital code superimposed on the input sensing signal. As the code generator circuit 13b feeds an input-sensing digital code, a prescribed permutation of 1s and 0s, to the signal applying circuit 13a, the signal applying circuit 13a outputs a serial rectangular wave where, for example, a HIGH and LOW represent a "1" and "0" of the input-sensing digital code respectively.

Built in, for example, the stylus 12, the signal detecting circuit 14 detects an electrical potential change of the stylus electrode 12a as an analogue detection signal, suitably amplifies and/or otherwise process the detection signal for transmission, and outputs the detection signal. The signal detecting circuit 14 only needs to be capable of detecting an electrical potential change of the stylus electrode 12a as an analogue detection signal and transmitting it to the input sensing section 15; the other actions, including the amplification, may be omitted. Accordingly, when the panel electrode 11c is fed with an input sensing signal, and the input tip 12b is in contact with the input receiving panel 11a, capacitively coupling the stylus electrode 12a and the panel electrode 11c, the signal detecting circuit 14 outputs an input sensing signal induced in the stylus electrode 12a as a detection signal. The signal detecting circuit 14 is not necessarily built in the stylus 12, and may be provided on the input receiving panel 11a.

The detection signal output from the signal detecting circuit 14 is converted into a digital detection signal by an A/D converter 16. The analogue-to-digital conversion of the detection signal is not always necessary, and the A/D converter 16 can be omitted.

The input sensing section 15 includes a code detecting section 17 and a determining circuit 18. The code detecting section 17 includes a converter circuit 17a and a threshold setting circuit 17b. The detection signal output from the A/D converter 16 is fed to the converter circuit 17a where the code superimposed on the detection signal is detected as the detection code. To perform the detection, the converter circuit 17a is fed with threshold data on threshold values (Vth) from the threshold setting circuit 17b and a timing signal representative of the cycle and phase of the serial code superimposed on the input sensing signal from the code generator circuit 13b. The threshold setting circuit 17b is able to vary its output threshold data so that it can set the threshold to a value suitable to the type of the detection signal.

Figure 2:
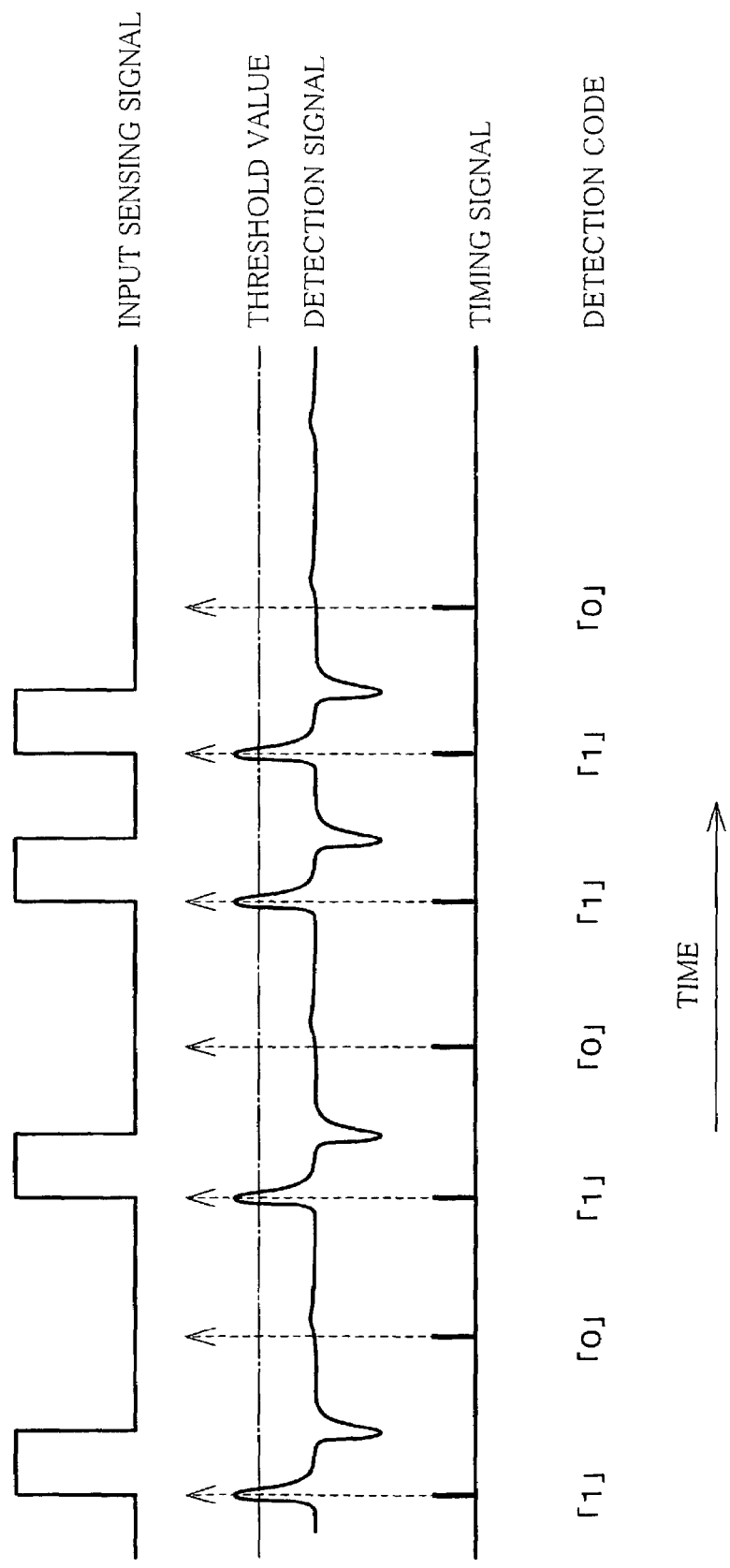
FIG. 2 is a timing chart showing a relationship among input sensing signal, detection signal, timing signal, and a detection code in the I/O-integrated display shown in FIG. 1.

The detection code is detected as illustrated in FIG. 2 which is a timing chart showing the input sensing signal output from the signal applying circuit 13a, the detection signal detected by the signal detecting circuit 14, the threshold setting made by the detection signal, the timing signal output from the code generator circuit 13b, and the detection code detected. The input sensing signal output from the signal applying circuit 13a is assumed to appear as a differential waveform when it is detected as the detection signal by the signal detecting circuit 14, because of conversion by the capacitive and resistive components of the circuits; a rising edge of the input sensing signal corresponds to a local maximum (peak) of the detection signal, and a falling edge of the input sensing signal corresponds to a local minimum of the detection signal. This is not however the only possibility; the input sensing signal output may appear as a rectangular wave, non-converted to a differential waveform, when it is detected as the detection signal.

Figure 3:
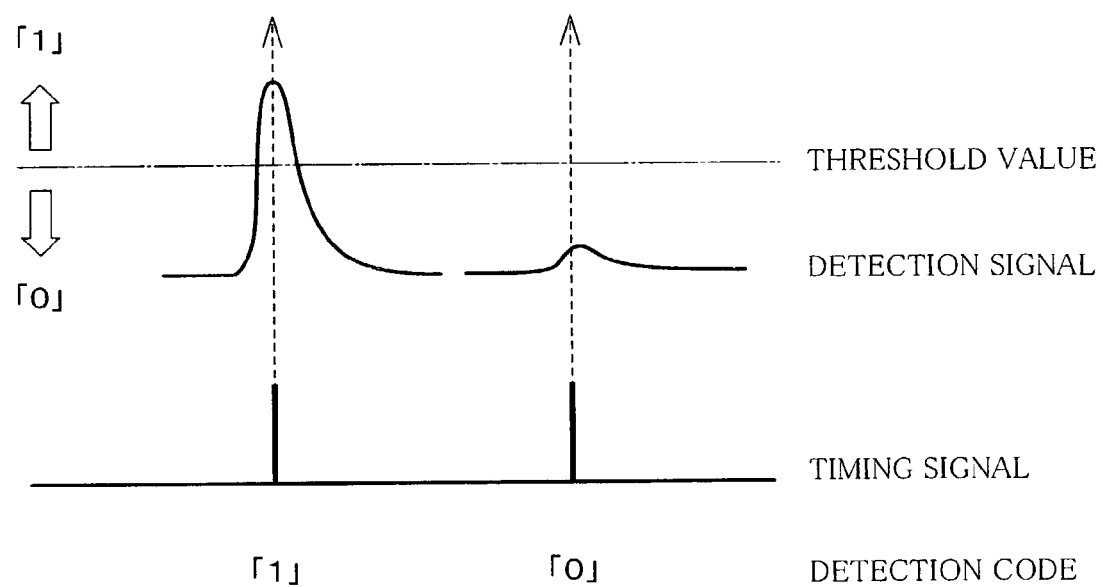
FIG. 3 is an explanatory drawing illustrating a method of converting a detection signal to a detection code in the I/O-integrated display in FIG. 1.

Now, referring to FIG. 3, the converter circuit 17a compares the value given by the detection signal with the threshold value at the time given by the timing signal and then adds a digit, "1," to the detection code if (Detection Signal Value) >(Threshold Value) and a digit, "0," if (Detection Signal Value)<(Threshold Value). Thus, a signal is induced in the stylus electrode 12a in agreement with the input sensing signal. If the induced signal is detected as the detection signal, the converter circuit 17a outputs the same detection code as the input-sensing digital code superimposed on the input sensing signal. In the case shown in FIG. 2, a 7-bit code, "1010110," is output as the detection code.

The determining circuit 18 is fed with the detection code output from the converter circuit 17a and the same input-sensing code as the output from the code generator circuit 13b to the signal applying circuit 13a. The determining circuit 18 compares these two, and if they match, determines that there has been an input made through the stylus 12, and if they do not, determines that there has been no input. The determining circuit 18 then outputs the result of the determining. Thus, the input sensing section 15 senses the input.

Figure 4:
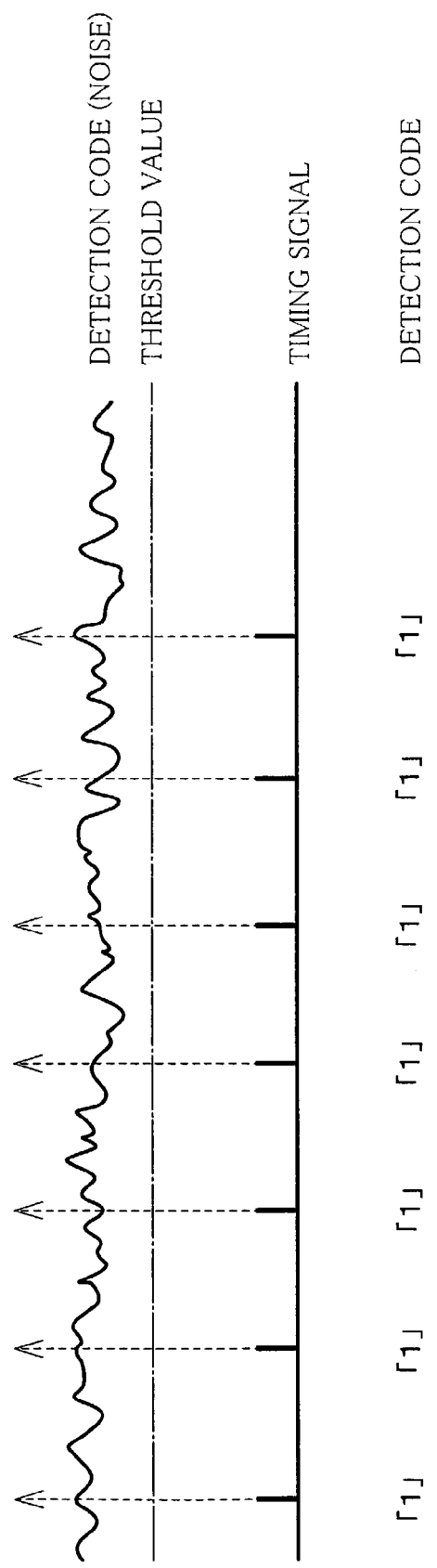
FIG. 4 is an explanatory drawing illustrating a detection code when the I/O-integrated display in FIG. 1 is picking up noise as a detection signal.

Now, let us assume that the stylus 12 is not in contact with the input receiving panel 11a, but the signal detecting circuit 14 has detected noise as a detection signal. Unlike input sensing signals, typical noise has a waveform such as illustrated in FIG. 4. The detection code illustrated is "1111111" and does not match with the input-sensing digital code, "1010110." The input sensing section 15 thus senses no input made through the stylus 12, producing no false sensing.

One cannot entirely deny the possibility that the input sensing section 15 becomes incapable of sensing an input actually being made through the stylus 12, if noise which cancels the detection signal matched with the input sensing signal is present in the detection signal and producing a detection code output such as illustrated in FIG. 4. Such cases, however, are extremely rare, because noise generally occurs when the stylus 12 is at a distance from the input receiving panel 11a and in close proximity of another device, such as a mobile phone engaging in transmission/reception, and will unlikely occur when the stylus 12 is in contact with the input receiving panel 11a. Considering these factors, the method is very effective in preventing false sensing.

Figure 5:
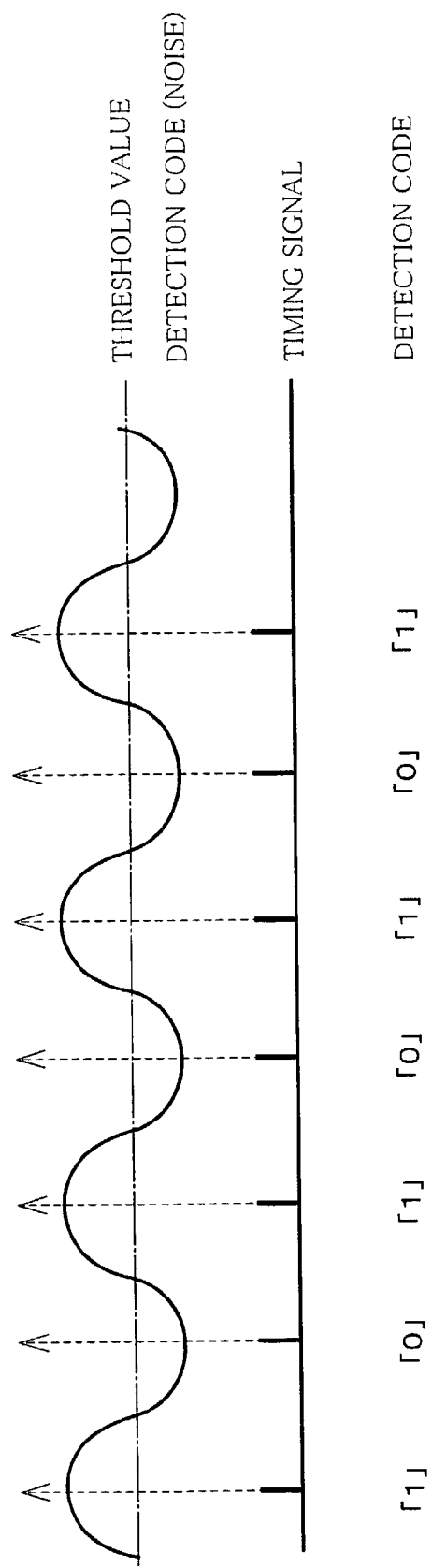
FIG. 5 is an explanatory drawing illustrating a detection code when the I/O-integrated display in FIG. 1 is picking up periodic noise as a detection signal.

Desirably, no input-sensing code should be chosen which will likely match with a detection code corresponding to noise. For example, periodic codes, such as "1010101," will likely match with a detection code corresponding to such periodic noise as shown in FIG. 5, and should be avoided.

Input-sensing codes with more bits provides a means of ensuring the prevention of false sensing. However, the more bits the input-sensing code has, the longer it takes for the signal applying circuit 13a to apply the input sensing signal and for the input sensing section 15 to process it. These factors should be considered when deciding the number of bits in the input-sensing code. The description here assumes that the input-sensing code has 7 bits; alternatively, it may have more or less than 7 bits (but more than 1 bit). The input sensing signal may also be varied in waveform, cycle, and other properties.

As described in the foregoing, in the input device 2, the signal supply section 13 supplies an input sensing signal for sensing an input to the panel electrode 11c. When, for example, the stylus 12 is brought into contact with the input receiving panel 11a, the resultant capacitive coupling of the panel electrode 11c with the stylus electrode 12a induces in the stylus electrode 12a a signal corresponding to the input sensing signal supplied to the panel electrode 11c. The signal detecting circuit 14 detects signals generated in the stylus electrode 12a, including that induced signal and those caused by noise.

If input sensing relies solely on the detection signal detected by the signal detecting circuit 14, false sensing occurs due to noise as was the case with conventional techniques. In contrast, in the input device 2, an input is sensed on the basis of a comparison by the input sensing section 15 of the input sensing signal supplied from the signal supply section 13 with the detection signal detected by the signal detecting circuit 14. The input sensing section 15 senses an input when, for example, the comparison shows that the input sensing signal is identical to the detection signal, and otherwise does not sense an input.

Specifying a signal which is unlikely to be caused by noise as the input sensing signal enables an input to be sensed practically only when, for example, the stylus 12 is brought into contact with the input receiving panel 11a, and a signal is sensed which is induced in the stylus electrode 12a in agreement with the input sensing signal. Thus, chances of noise-caused false sensing become much lower.

Preferably, the input sensing signal is a signal representative of an input-sensing digital code as described in the foregoing, and the input sensing section 15 includes the code detecting section (code detecting means) 17 which detects a digital code from a detection signal and a determining circuit (determining means) 18 which determines that an input has been made if the detection code (digital code) detected by the code detecting section 17 matches with the input-sensing digital code.

When this is the case, the input sensing signal is the one representative of, for example, an input-sensing digital code composed of a pulse signal and its differential waveform. In the input sensing section 15, the code detecting section 17 detects a detection code from a detection signal. Further, in the input sensing section 15, the determining circuit 18 determines that an input has been made if the detection code matches with the input sensing digital code. The determination based on the digital code makes it easy to compare the input sensing signal with the detection signal and allows for a simpler device structure.

The determination may be necessarily based on the digital code. Alternatively, it may be based on an analogue signal or a digital signal produced by primitive conversion of an analogue signal. For example, the determination may be made based on a detection signal converted to digital by the A/D converter 16 and a signal converted to digital from the input sensing signal. When this is the case, for example, a predetermined tolerable range may be determined for sampling values of the input sensing signal, and the input sensing signal may be considered identical to the detection signal if the detection signal in a predetermined period is within a tolerable range corresponding to all the sampling values or a considerably large portion of them.

Preferably, the input device 2 is able to recognize input coordinates when there is an input made through the stylus 12. To this end, the input device 2 is preferably provided with a signal supply section (second signal supply means) 13 supplying a coordinate recognition signal to the panel electrode 11c and also with a coordinate recognizing section (coordinate recognizing means) 19 recognizing the coordinates of the stylus 12 on the input receiving panel 11a from a detection signal when the input sensing section 15 has sensed an input.

The signal supply section 13 supplies, to the panel electrode 11c, a position recognizing signal by which the input coordinates are recognized. The signal supply section 13 may be structured so that it has two separate parts, one related to the input sensing signal and another related to the coordinate recognizing signal, or it has only one part operating both ways.

A coordinate recognizing signal is fed to the coordinate recognizing section 19 after conversion to a digital detection signal or detection code, similarly to the input sensing signal. From the detection signal and code, the coordinate recognizing section 19 recognizes the input coordinates made through the stylus 12. The coordinate recognizing section 19 also receives a result of the determination from the determining circuit 18, and in response to a result of the determination that an input has been made, recognizes the input coordinates. Thus, coordinate recognizing operation is not unnecessarily triggered by noise, which alleviates the workload of the device.

The input coordinates recognized by the coordinate recognizing section 19 are supplied to input coordinate processing means executing processes on the basis of the input coordinates, and used for those processes. Here, it is presumed that the coordinates are supplied to a display controller section 20 as the input coordinate processing means. The display controller section 20 controls a display panel driver circuit (display panel driver) 21 so that, for example, a marker is displayed on the display panel 11b at the input coordinate. This is not the only possible process executed by the input coordinate processing means; a variety of other input-based processes is possible in typical situations. If the I/O-integrated display 1 is used with, or as part of, a personal computer (PC) or portable personal digital assistant (PDA), the input coordinate processing means may be constituted by software (operating system, application, etc.) running on that PC or PDA.

The input device 2 is preferably arranged to sense a contact of the stylus 12 with the input receiving panel 11a and sense an input based on the sensed contact. To this end, it is preferable if the stylus 12 is provided with an input tip 12b that comes into contact with the input receiving panel 11a when an input is to be made and also provided with a contact sensing switch (contact sensing means) 12c sensing a contact of the input tip 12b with an object. It is also preferable if the input sensing section 15 senses an input based on a comparison of an input sensing signal with a detection signal when the contact sensing switch 12c has sensed a contact of the input tip 12b with an object.

With this arrangement, when an input is made through the stylus 12, the input tip 12b on the stylus 12 comes into contact with the input receiving panel 11a, and the contact sensing switch 12c in the stylus 12 enables sensing of a contact of the input tip 12b with an object (in most cases, a solid). Upon the contact sensing switch 12c having sensed a contact of the input tip 12b with the object, the input sensing section 15 senses an input which has been made based on a comparison of an input sensing signal with a detection signal.

Thus, false input sensing is prevented by the reliance on the sensing by the contact sensing switch 12c, even when the input tip 12b on the stylus 12 is not in contact with the input receiving panel 11a, but a detection code caused by noise which matches with an input-sensing digital code is detected. Thus, false sensing is less likely to occur.

Figure 6:
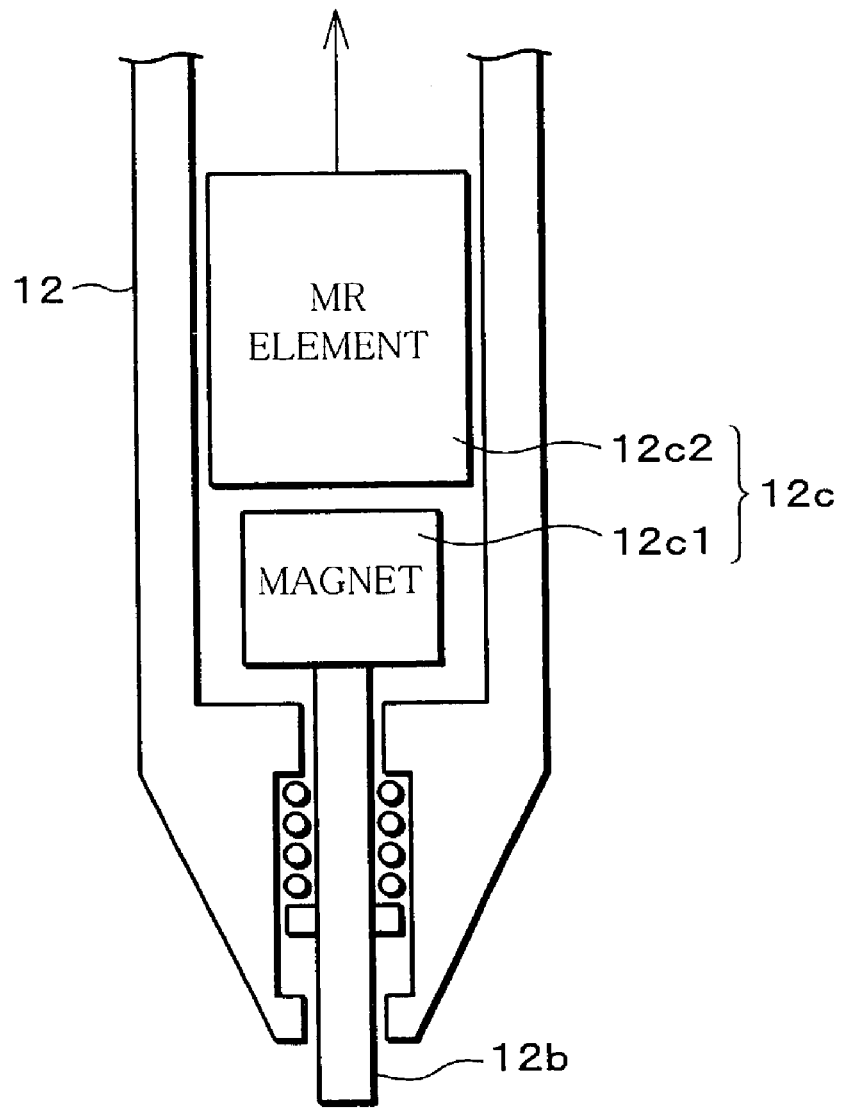
FIG. 6 is a cross-sectional view showing a configuration of a contact sensing switch provided in a stylus in the I/O-integrated display in FIG. 1.

An example of the arrangement of the stylus 12 is given in FIG. 6, in which the stylus electrode 12a, signal detecting circuit 14, and other structure for signal detection are omitted.

The stylus 12 is adapted so that its input tip 12b is biased by a spring and allowed to move in projection directions. The contact sensing switch 12c is constituted by a magnet 12c1 and a magneto-resistive element (MR element) 12c2. The magnet 12c1 changes its distance from the MR element 12c2 as it moves with the input tip 12b. When the stylus 12 comes in contact with the input receiving panel 11a, the input tip 12b is pressed into the stylus 12, causing the magnet 12c1 to move closer to the MR element 12c2; when the stylus 12 is separated from the input receiving panel 11a, the input tip 12b sticks out of the stylus 12, allowing the magnet 12c1 to move away from the MR element 12c2. The MR element 12c2 exhibits an electrical resistance that changes with its distance from the magnet 12c1, and produces an output representing a result of sensing whether the input tip 12b is in contact with an object in accordance with that change.

In response to the result of the sensing, for example, if the input tip 12b is in contact with an object, the stylus electrode 12a is connected to the signal detecting circuit 14; if the input tip 12b is not in contact with an object, the stylus electrode 12a is isolated from the signal detecting circuit 14. Thus, the input sensing section 15 is enabled for input sensing only when a contact of the input tip 12b with an object is sensed.

The contact sensing switch 12c may take another form, rather than the one described above, including a mechanical switch or a photocoupler. The contact sensing switch 12c may be take another structure, rather than the one illustrated in FIG. 6, including the one illustrated in FIG. 17 in relation to prior art.

The input device 2 in the I/O-integrated display 1 shown in FIG. 1 supplies an input sensing signal, etc. to the panel electrode 11c and detects a signal produced in the stylus electrode 12a as a detection signal. Alternatively, the input device 2 in the I/O-integrated display 1 shown in FIG. 1 may supply an input sensing signal, etc. to the stylus electrode 12a and detects a signal produced in the panel electrode 11c as a detection signal, as does the input device 2a in the I/O-integrated display 1a shown in FIG. 7. Those components in FIG. 7 which have equivalent functions as those in FIG. 1 are identified by the same numerals as in FIG. 1.

The input device 2a senses an input by means of capacitive coupling between the panel electrode (second electrode) 11c in the input receiving panel 11a and the stylus electrode (first electrode) 12a in the stylus 12. The input device 2a includes a signal supply section (first signal supply means) 13 supplying an input sensing signal to the stylus electrode 12a, a signal detecting circuit (signal detecting means) 14 detecting a signal produced in the input receiving panel 11a, and an input sensing section (input sensing means) 15 sensing an input made through the stylus 12 based on a comparison of an input sensing signal with a detection signal detected by the signal detecting circuit 14.

Figure 7:
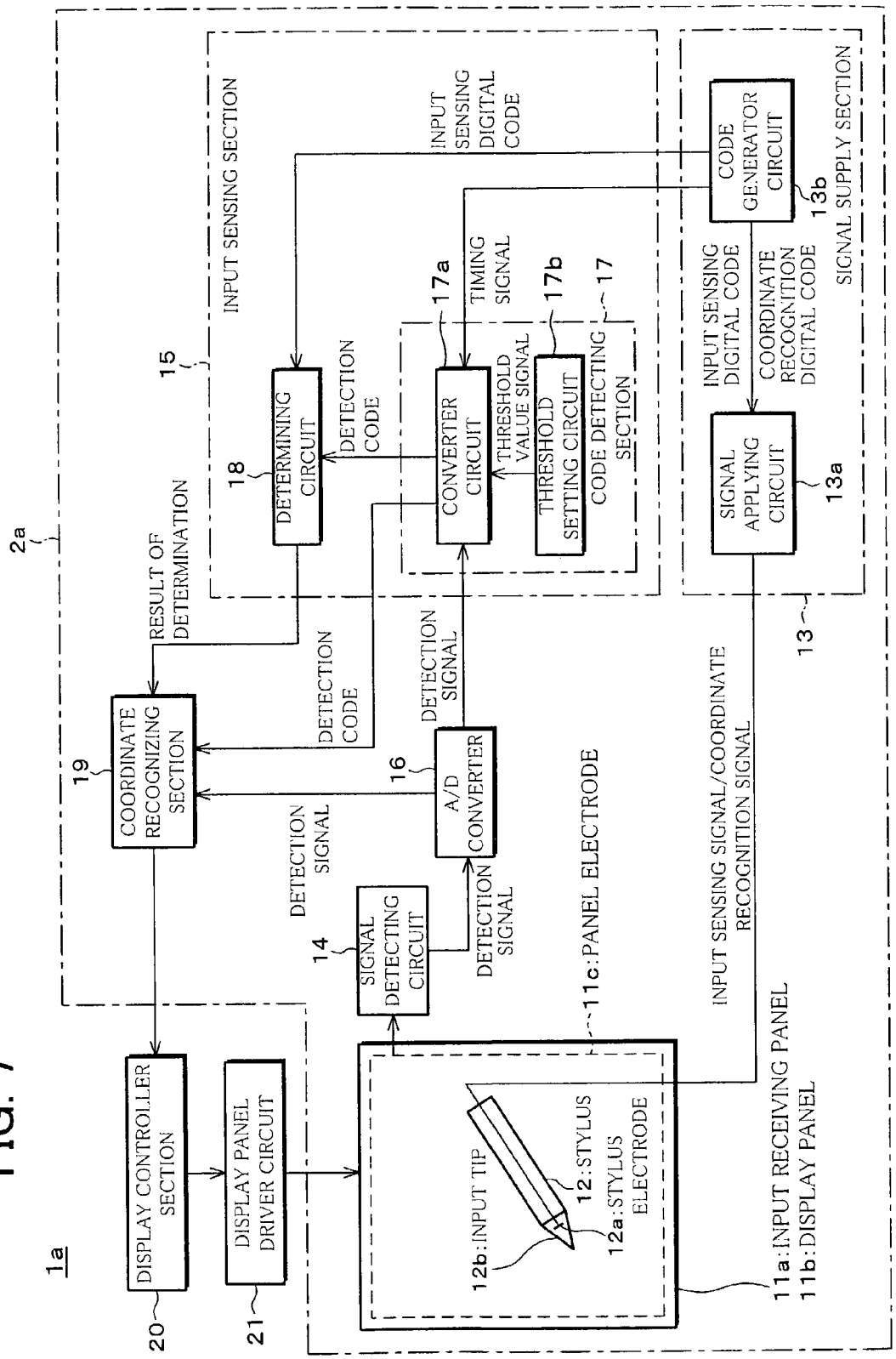
FIG. 7 is a block diagram showing a variant of the I/O-integrated display in FIG. 1.

FIG. 7 shows the coordinate recognizing signal being supplied to the stylus electrode 12a for detection through the panel electrode 11c. Alternatively, the coordinate recognizing signal may be supplied to the panel electrode 11c for detection through the stylus electrode 12a. When this is the case, the coordinates can be recognized as in FIG. 1.

FIG. 7 shows the signal detecting circuit 14 being provided separately from the display panel driver circuit 21. Alternatively, the signal detecting circuit 14 may be incorporated in the display panel driver circuit 21.

Figure 8:
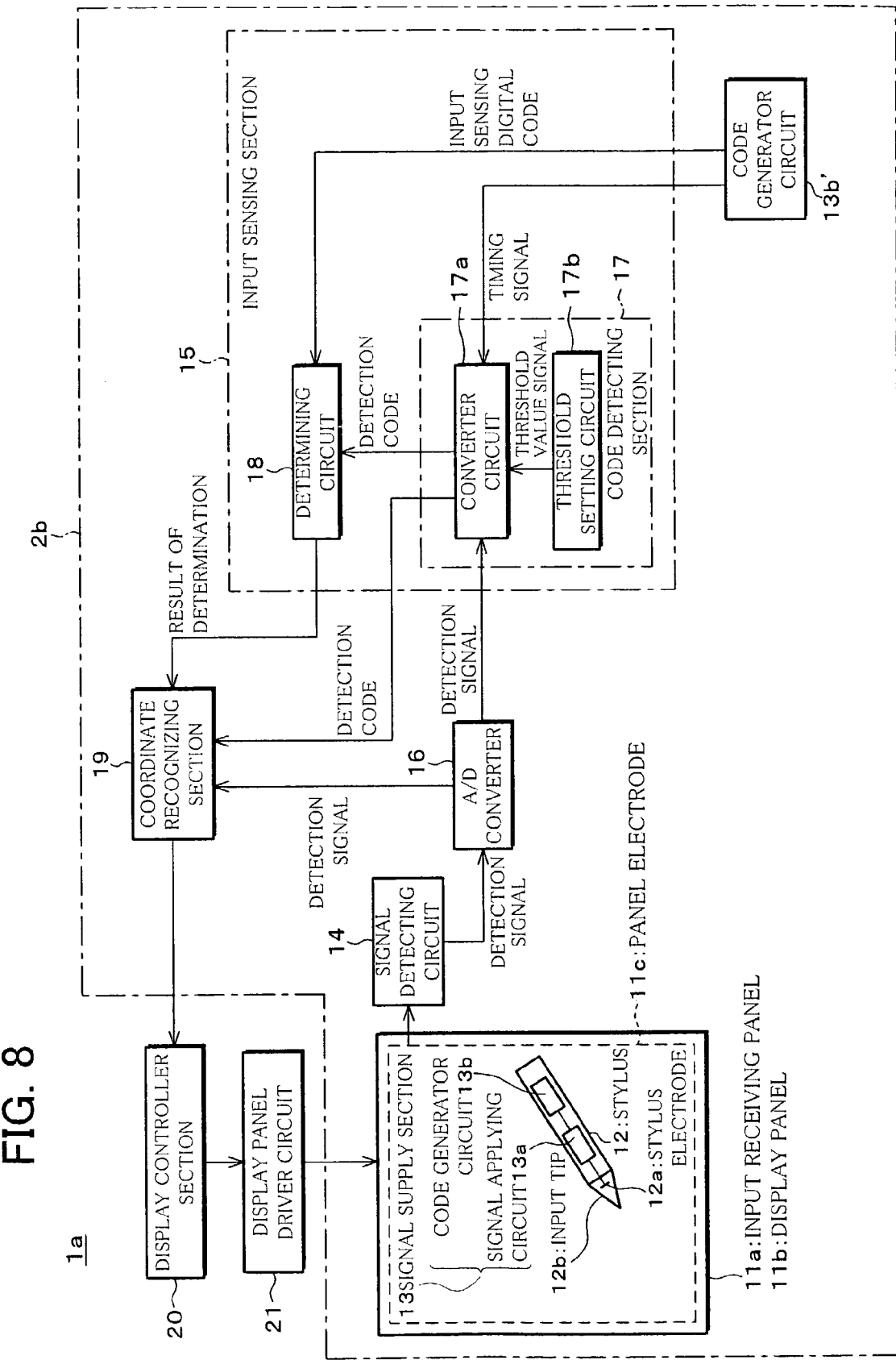
FIG. 8 is a block diagram showing another variant of the I/O-integrated display in FIG. 1.

FIG. 1 and FIG. 7 show typical structures: i.e., the signal supply section 13, input sensing section 15, A/D converter 16, coordinate recognizing section 19, display controller section 20, and input device 21 are mounted to the input receiving panel 11a, and the stylus 12 is connected via cable to the signal supply section 13 and the A/D converter 16 in the input receiving panel 11a. FIG. 8 shows a partial modification of the structure in FIG. 7 in which the cable connecting the stylus 12 to the input receiving panel 11a is omitted.

The input device 2b in the I/O-integrated display 1b in FIG. 8 has a signal supply section 13 built in the stylus 12, and includes a code generator circuit (signal generator means) 13b', with comparable functionality as the code generator circuit 13b in the signal supply section 13, which outputs a timing signal in synchronization with an input-sensing digital code (other sensing signal) identical to the one produced by the code generator circuit 13b in the signal supply section 13 and an input-sensing digital code supplied from the code generator circuit 13b in the signal supply section 13. Thus, in the input device 2b, the input receiving panel 11a and the stylus 12 can be separated from each other. Those components in FIG. 8 which have equivalent functions as those in FIG. 1 or FIG. 7 are identified by the same numerals as in FIG. 1.

The description here assumes that the input devices 2, 2a, 2b constitute an integral part the I/O-integrated displays 1, 1a, 1b respectively. The input devices 2, 2a, 2b are not necessarily integrated into the display. The input devices 2, 2a, 2b may be used as a stand-alone, dedicated input tool.

The following will describe specific arrangement examples of the I/O-integrated display with a focus on the arrangement of the I/O-integrated display as a display. Two arrangements will be illustrated in embodiments 1 and 2.

Embodiment 1

Figure 9:
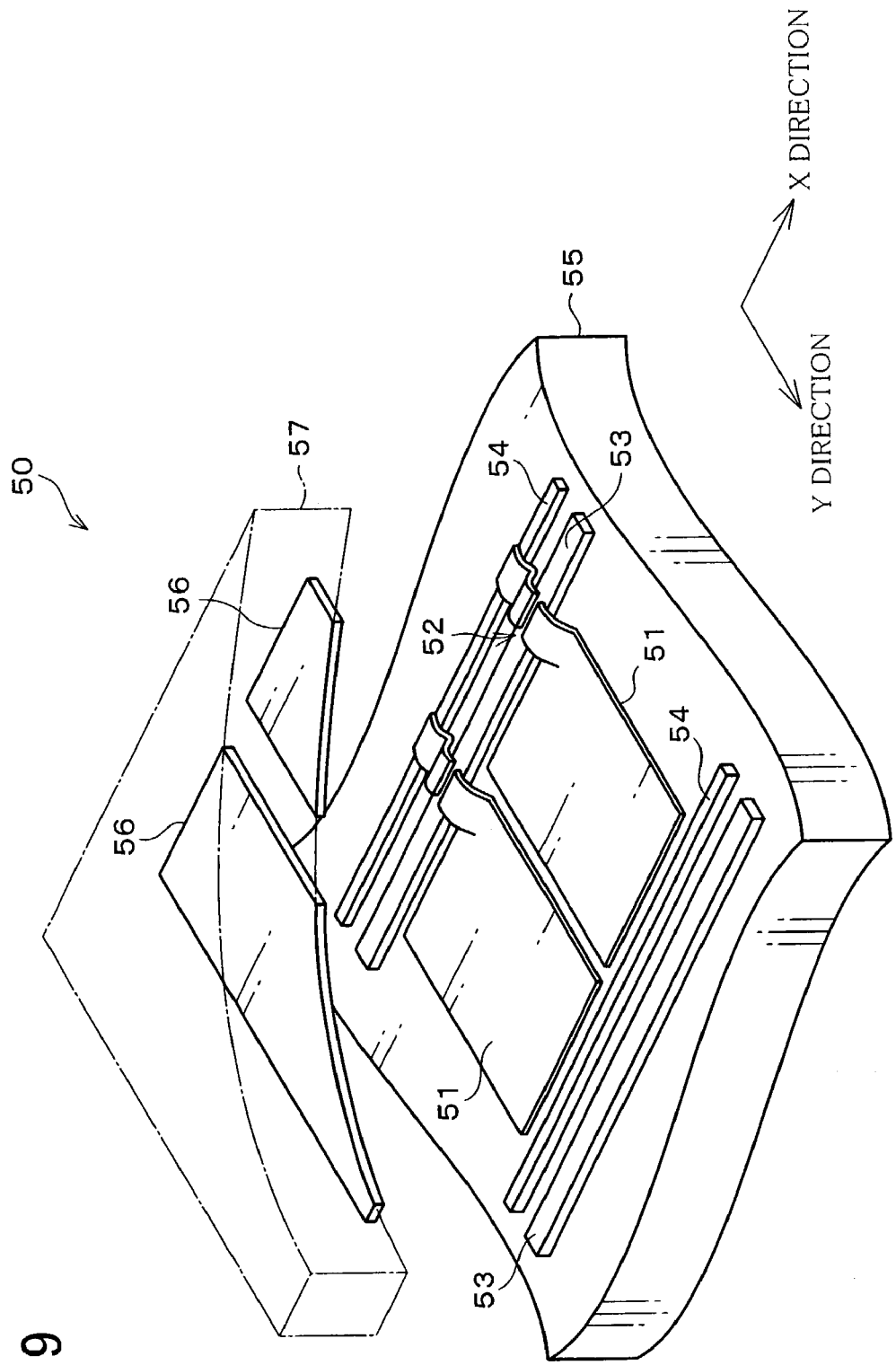
FIG. 9 is a perspective view showing, as an example, a configuration of the display panel in FIG. 1.
Figure 10:
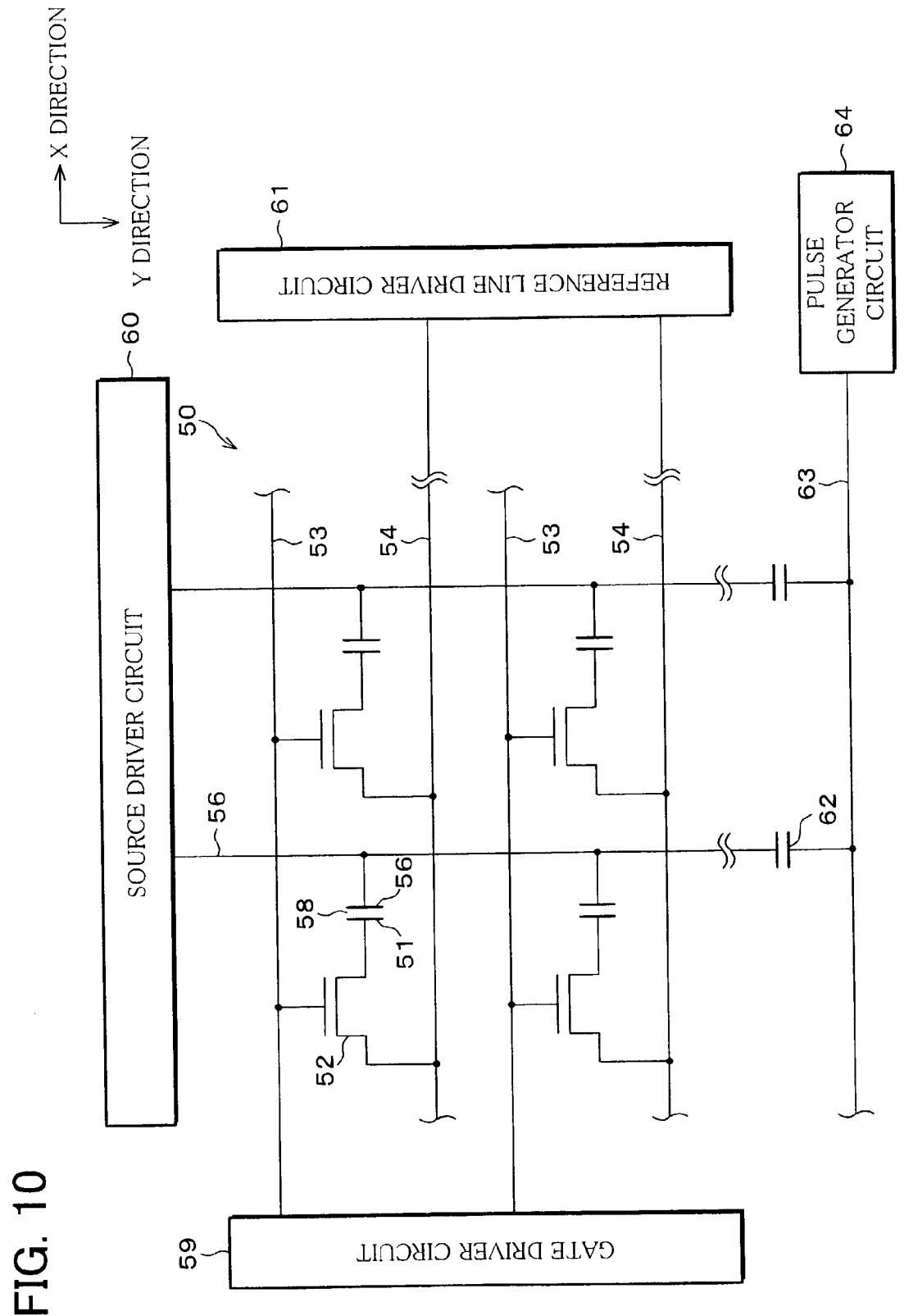
FIG. 10 is a circuit diagram showing an equivalent circuit of the display panel in FIG. 9 and its peripheral circuits.

The I/O-integrated display 1 in FIG. 1 with the input device 2 is now discussed. In embodiment 1, the display is a so-called "opposite source, active matrix liquid crystal display." The display panel 50 as the display panel 11b in FIG. 1 is arranged as shown in FIG. 9 and FIG. 10. FIG. 10 is an equivalent circuit of the display panel 50. The display panel 50 includes a first, active matrix substrate 55 and a second, opposite substrate 57.

On the first substrate 55 are there formed a matrix of pixel electrodes 51 arranged in rows and columns, a plurality of TFTs (switching elements) 52 each provided to a different pixel electrode 51, a plurality of scan lines 53 each provided in a different row and connected to all the gates (control leads) of those TFTs 52 which sit in that row, and a plurality of reference lines 54 each provided in a different row and connected to all those pixel electrodes 51 which sit in that row through those associated TFTs 52. The reference lines 54 may be coupled together at an end of the rows.

On the second substrate 57 are there formed a plurality of signal electrodes 56 arranged in stripes, each provided in a different column opposite to all those pixel electrodes 51 which sit in that column. The signal electrodes 56 are transparent and made from an ITO film, for example.

Between the first substrate 55 and the second substrate 57 is there inserted a liquid crystal layer 58 as an electro-optical layer of which optical properties are controlled by a potential difference between the oppositely located pixel electrodes 51 and signal electrodes 56. The description here assumes a liquid crystal layer 58 as an electro-optical element; alternatives are possible, including an organic EL element layer.

Let us refer to the row direction, i.e., the direction along which the scan lines 53 extend, as the x-direction and to the column direction, i.e., the direction along which the signal electrodes 56 extend, as the y-direction.

The scan lines 53 are coupled at an end thereof to a gate driver circuit 59 so that they can be addressed sequentially by the gate driver circuit 59. The signal electrodes 56 are coupled at an end thereof to a source driver circuit 60 so that they can be fed with a display signal from the source driver circuit 60 to display those pixels in the row addressed by the gate driver circuit 59. The reference lines 54 are coupled to a reference line driver circuit 61 so that the reference lines 54 have their potentials set by the reference line driver circuit 61 to those values to which the potentials of the pixel electrodes 51 should be set to produce a display in accordance with a display signal. If the liquid crystal layer 58 is driven by AC voltage, the potential of the reference lines 54 is reversed periodically.

The gate driver circuit 59, the source driver circuit 60, and the reference line driver circuit 61 constitute the display panel driver circuit 21 in FIG. 1 and combine with the display panel 50 to constitute a liquid crystal display.

The other ends of the signal electrodes 56, opposite to the source driver circuit 60, are all connected to a common wire 63 via respective capacitors 62. The common wire 63 is connected to a pulse generator circuit 64.

Operation of the I/O-integrated display 1 incorporating the display panel 50 is now described. The gate driver circuit 59 scans the scan lines 53 by sequentially applying a scan pulse to the scan lines 53 according to a display control signal from the display controller section 20 in FIG. 1. The scanning action turns on the TFTs 52 that are connected to the scan line 53 to which the scan pulse is being applied and makes the potentials of the associated pixel electrodes 51 equal to the value to which the potential of the associated reference line 54 is set. In synchronization with the scanning by the scan lines 53 in accordance with a display control signal, the source driver circuit 60 applies a drive pulse in accordance with a display signal to the signal electrodes 56. Thus, the drive pulse is applied to the liquid crystal layer 58 in the switched-on TFTs 52, and the display signal is written.

The source driver circuit 60 functions as the display panel driver circuit 21 in FIG. 1 as described in the foregoing. Also, the source driver circuit 60 functions as the signal applying circuit 13a in FIG. 1 as will be described later, simultaneously applying a coordinate recognizing signal to all the signal electrodes 56 in accordance with a coordinate recognition digital code from the code generator circuit 13b in FIG. 1 independently from the application of the drive pulse. The coordinate recognizing signal applied by the source driver circuit 60 is used for the recognition of the x-coordinate.

The pulse generator circuit 64 also functions as the signal applying circuit 13a in FIG. 1, applying an input sensing signal and a coordinate sensing signal to the common wire 63 in accordance with the input-sensing digital code and the coordinate recognition digital code from the code generator circuit 13b in FIG. 1. The input sensing signal and the coordinate sensing signal applied to the common wire 63 is passed onto the capacitors 62 and applied to the signal electrodes 56. The coordinate recognizing signal applied by the pulse generator circuit 64 is used for recognizing a y-coordinate.

Thus, in the display panel 50, the signal electrodes 56 functions as the panel electrode 11c in FIG. 1.

Figure 11:
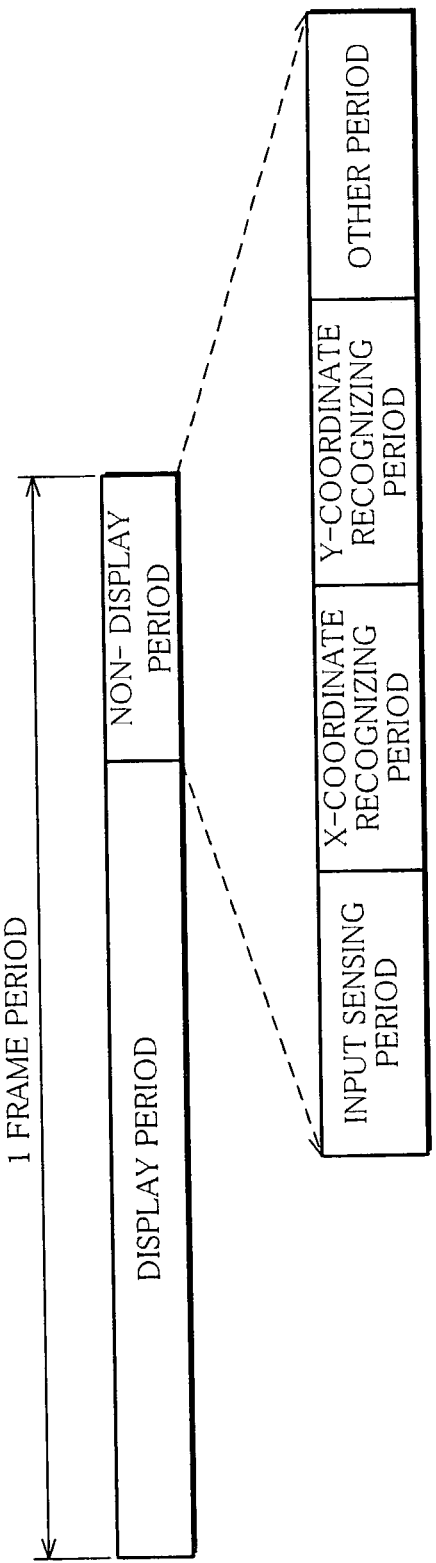
FIG. 11 is an explanatory drawing illustrating contents of a frame period when the display panel in FIG. 9 is driven.

Signals are applied to the signal electrodes 56 at the following timings. As shown in FIG. 11, a frame period (vertical period) is time-divided into a display period during which the display panel 50 displays an image and non-display periods including a vertical blanking period. During the display period, the drive pulse is applied to the signal electrodes 56 sequentially as is the case with ordinary active matrix liquid crystal displays. Meanwhile, a non-display period is time-divided into an input sensing period, an x-coordinate recognizing period, a y-coordinate recognizing period, and other periods. The input sensing period, x-coordinate recognizing period, and y-coordinate recognizing period will be described in this order.

During an input sensing period, the pulse generator circuit 64 applies, for example, the input sensing signal shown in FIG. 2 to the common wire 63. Since the common wire 63 is connected to the signal electrodes 56 via the capacitors 62, a signal with the differential waveform of the input sensing signal is induced in the signal electrodes 56. If the stylus 12 is in contact with the display panel 50, the differential-waveform signal induced in the signal electrodes 56 is further induced in the stylus electrode 12a in the stylus 12. Thus, as mentioned in the foregoing, the input sensing section 15 senses an input.

The description so far has assumed that the pulse generator circuit 64 applies an input sensing signal to the signal electrodes 56 via the common wire 63, etc. This is however not the only possibility; alternatively, the source driver circuit 60 may directly apply an input sensing signal to the signal electrodes 56, in which event the detection signal may have almost the same waveform as the input sensing signal.

During an x-coordinate recognizing period, the source driver circuit 60 applies an x-coordinate recognizing signal simultaneously to all the signal electrodes 56 in accordance with a multi-bit x-coordinate recognition digital code. Each signal electrode 56 is given a unique x-coordinate recognition digital code. For example, 8-bit digital codes, i.e., 00000000, 00000001, . . . , 11111110, and 11111111, are assigned to the signal electrodes, starting with the one near the gate driver circuit 59. To apply, for example, a digital code, 10010111, to the related signal electrode 56, HIGH and LOW potentials, representing a "1" and "0" respectively of the x-coordinate recognizing signal, are applied to the signal electrode 56 according to the signal "1," "0," "0," "1," "0," "1," "1," and "1" in sequential time order starting with the first bit.

The x-coordinate recognizing signal thus applied to the signal electrodes 56 is detected by the signal detecting circuit 14 and converted to a detection code by the converter circuit 17a. The detection code is then supplied to the coordinate recognizing section 19 where the x-coordinate recognized based on the incoming detection code and the x-coordinate recognition digital code. Although not shown in FIG. 1, it would be adequate if the x-coordinate recognition digital code is supplied from the code generator circuit 13b to the coordinate recognizing section 19.

Figure 12:
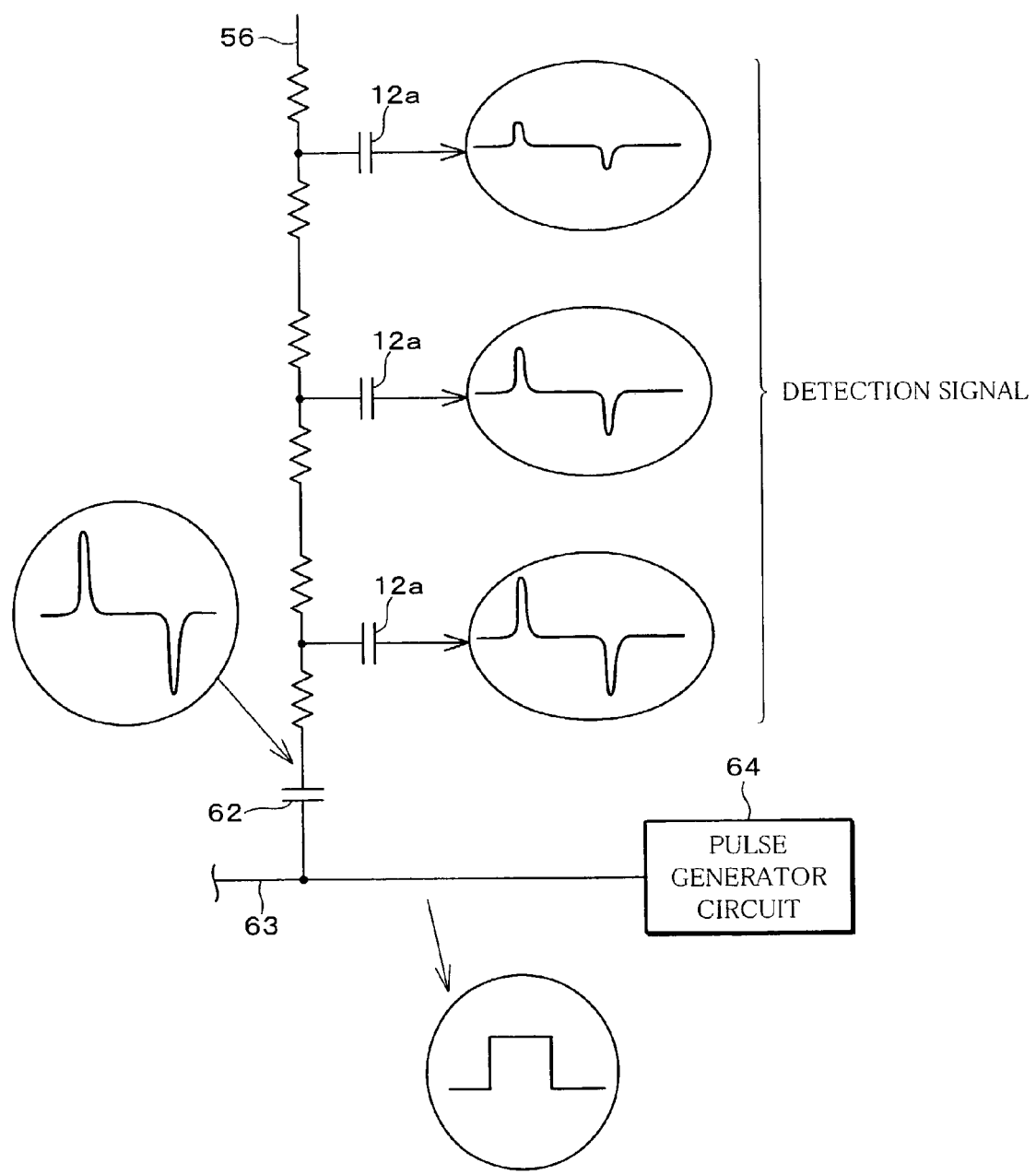
FIG. 12 is an explanatory drawing illustrating a method of recognizing y-coordinates on the display panel in FIG. 9.

During a y-coordinate recognizing period, as shown in FIG. 12, the pulse generator circuit 64 applies a rectangular pulse as a y-coordinate recognizing signal to the common wire 63. Hence, the differential waveform of the rectangular pulse appears at the signal electrodes 56 which are connected to the common wire 63 via the associated capacitors 62. Since each signal electrode 56 has a predetermined line resistance, the differential waveform induced in that signal electrode 56 decays as it travels away from the capacitor 62. The y-coordinate is therefore recognizable based on the peak amplitude of the signal induced in the stylus electrode 12a in the stylus 12. A detection signal in accordance with the y-coordinate recognizing signal is converted to digital by the A/D converter 16 in FIG. 1 and supplied to the coordinate recognizing section 19 where the y-coordinate is recognized based on the peak amplitude of the detection signal.

Figure 13:
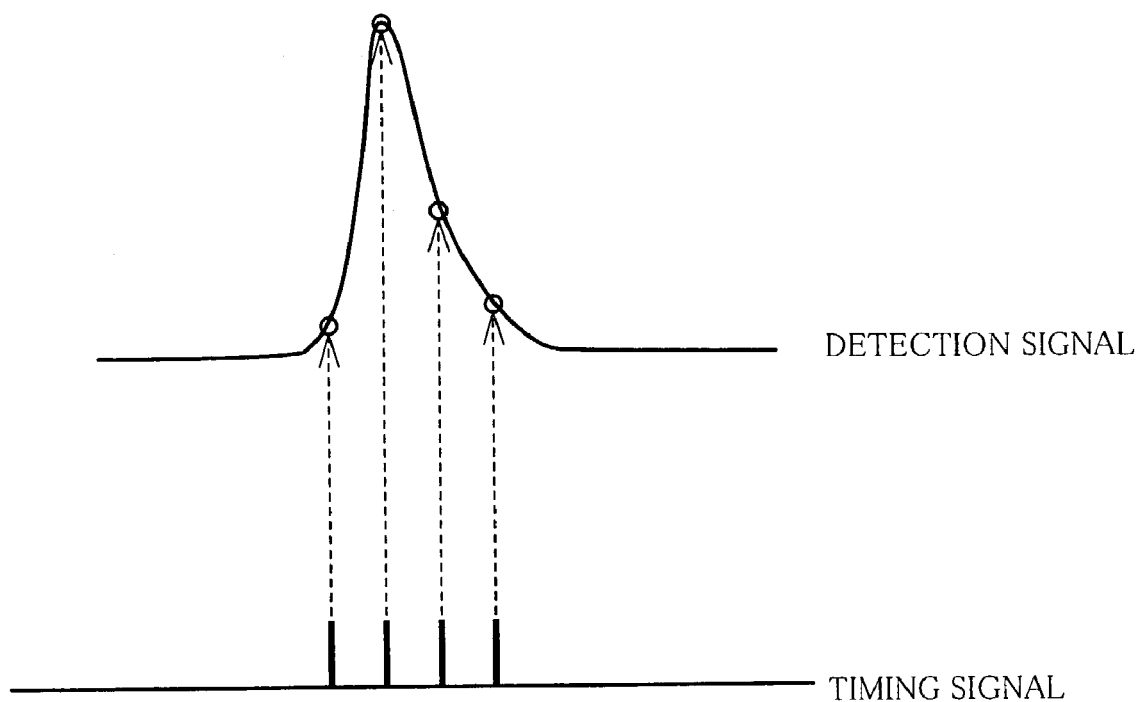
FIG. 13 is an explanatory drawing illustrating a method of sensing a peak of a detection signal in the I/O-integrated display in FIG. 1.

To accurately sense the peak amplitude of the detection signal, it is desirable if the greatest of the values detected at a train of timing signal pulses generated near the peak of the detection signal is sensed as the peak amplitude as shown in FIG. 13. When this is the case, the peak amplitude can be accurately sensed even if the differential waveform changes appreciably in phase according to the position of the signal electrode 56. Although not shown in FIG. 1, it would be adequate if the timing signal is supplied from the code generator circuit 13b to the coordinate recognizing section 19.

In this manner, the source driver circuit 60 and pulse generator circuit 64 as the signal supply section 13 supplies an input sensing signal and a coordinate recognizing signal to the signal electrodes 56 during a non-display period of the display panel 50. This prevents the input of the input sensing signal and the coordinate recognizing signal from disturbing the display of an image.

It is preferable if during a period when the source driver circuit 60 and the pulse generator circuit 64 supply an input sensing signal and a coordinate recognizing signal to the signal electrodes 56, the other electrodes and wires in the display panel 50, such as the scan lines 53 and the reference lines 54, are held at a constant potential. if the potential of the other electrodes and wires changes, the change may affect the detection signal, which is potential cause for noise.

Especially, the reference lines 54 are likely to produce noise, due to relatively large potential changes that occur on the reference lines 54 when their polarity is reversed to drive the liquid crystal layer 58 as would be the case in typical instances. It is therefore preferable if the reference lines 54, among other lines, are held at a constant potential. Thus, by allowing no potential changes to occur on the reference lines 54 which would be a likely cause to produce noise on the detection signal, noise is prevented from being present in the detection signal.

The above description has assumed that the display panel 50 in FIG. 9 is used for the I/O-integrated display 1 in FIG. 1; alternatively, the display panel 50 may be used for the I/O-integrated display 1a in FIG. 7 or the I/O-integrated display 1b in FIG. 8, in which event, the x-coordinate is recognizable by obtaining a detection signal from each one of the signal electrodes 56 through the signal detecting circuit 14 and detecting that one of the signal electrodes 56 in which a coordinate recognizing signal is being induced, and the y-coordinate is recognizable from the detection signal of the signal electrode 56.

Embodiment 2

Figure 14:
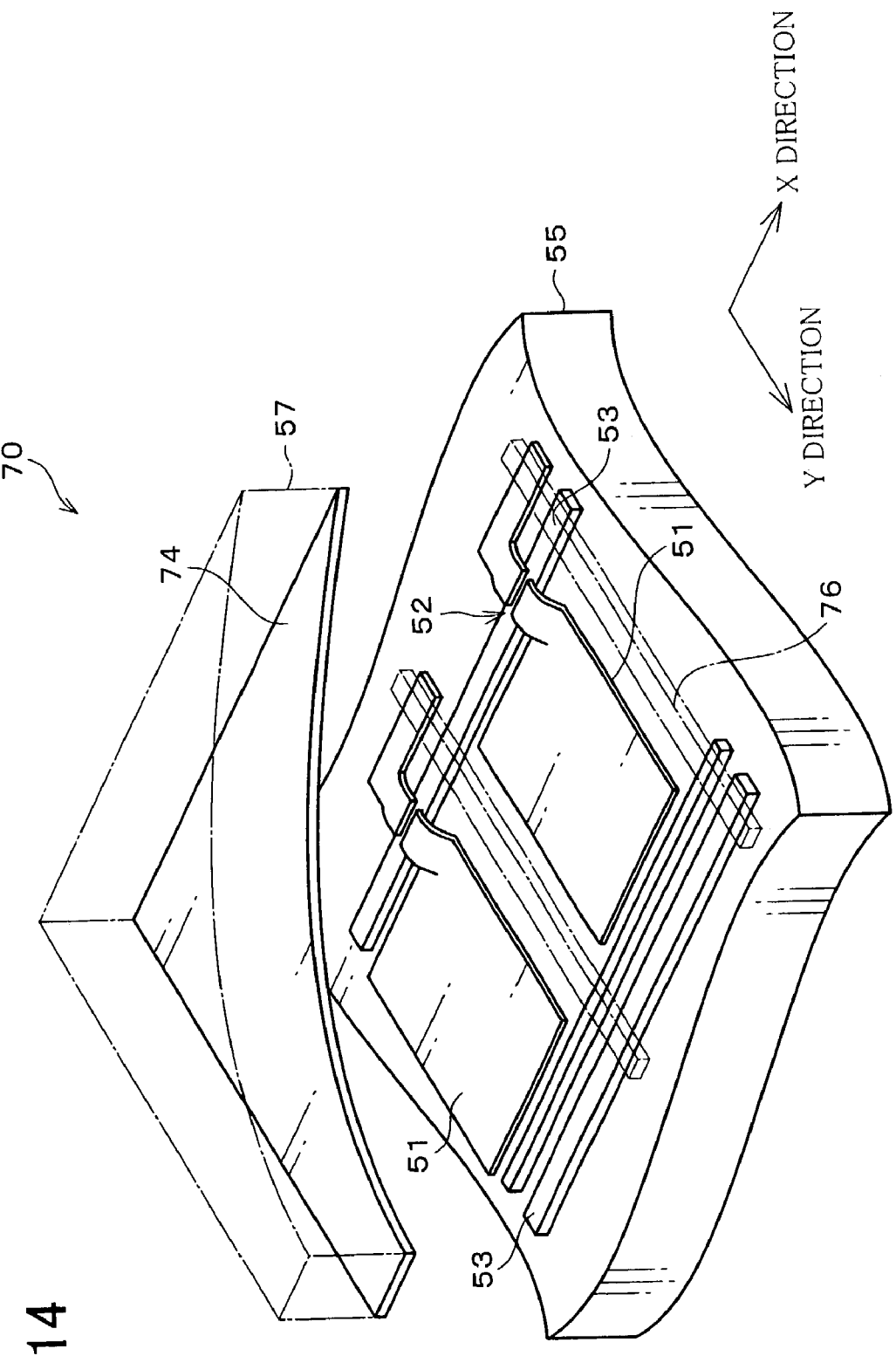
FIG. 14 is a perspective view showing, as an example, another configuration of the display panel in FIG. 1.
Figure 15:
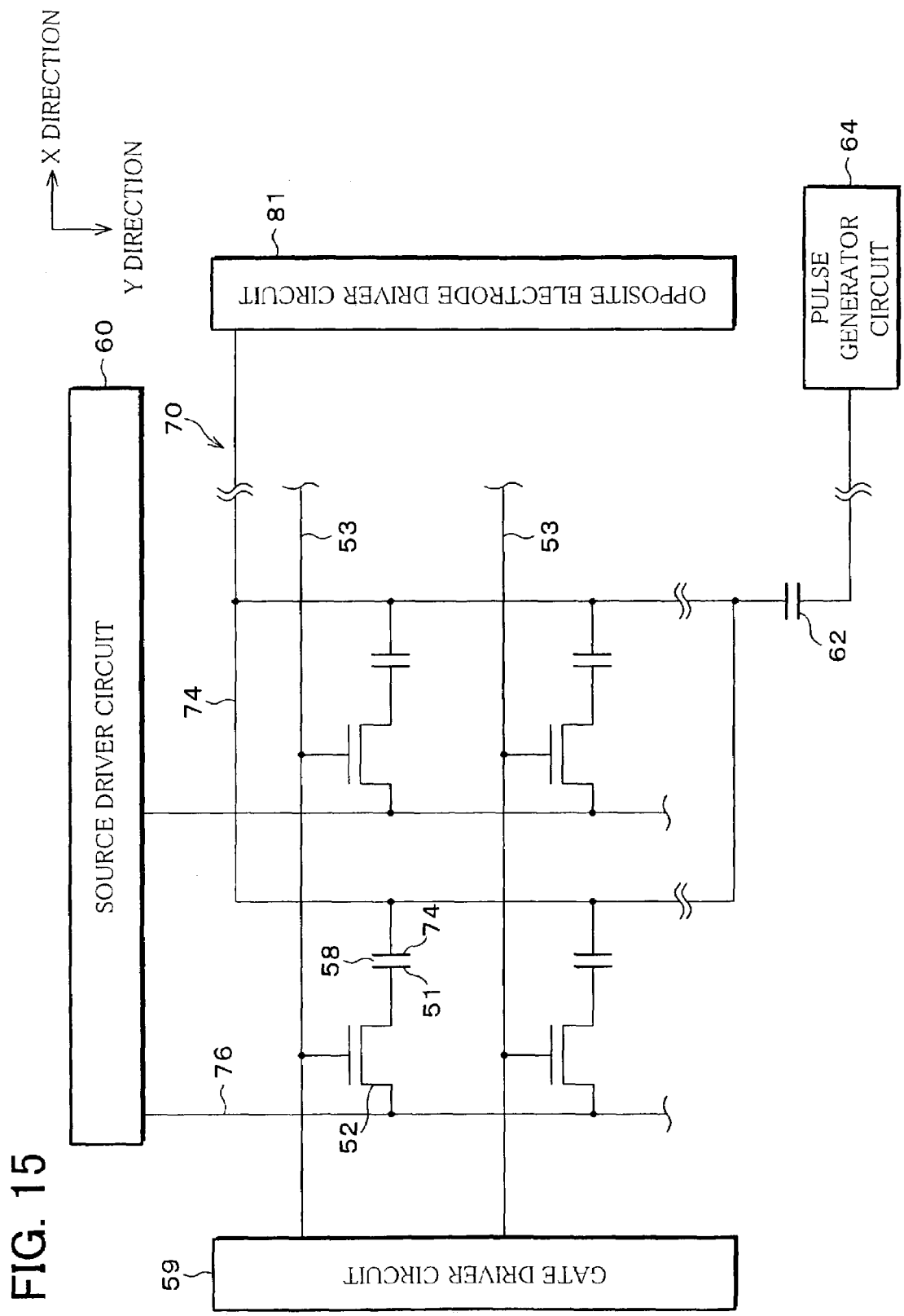
FIG. 15 is a circuit diagram showing an equivalent circuit of the display panel in FIG. 14 and its peripheral circuits.

The I/O-integrated display 1 in FIG. 1 with the input device 2 is now discussed. In embodiment 2, the display is a so-called "opposite common electrode, active matrix liquid crystal display." The display panel 70 as the display panel 11b in FIG. 1 is arranged as shown in FIG. 14 and FIG. 15. FIG. 15 is an equivalent circuit of the display panel 70. Those components in FIG. 14 and FIG. 15 which have equivalent functions as those in FIG. 9 and FIG. 10 are identified by the same numerals as in FIG. 9 and FIG. 10. The display panel 70 includes a first, active matrix substrate 55 and a second, opposite substrate 57 too. The display panel 70 has following differences from the display panel 50.

On the first substrate 55 are there formed a plurality of signal lines 76 each provided in a different column and connected to all those pixel electrodes 51 which sit in that column through those associated TFTs 52. That is, the signal lines 76 are arranged to cross the scan lines 53. The signal lines 76 are insulated from the scan lines 53 by an insulation layer (not shown). The signal lines 76 are provided in place of the reference lines 54 in the display panel 50.

On the second substrate 57 are there formed an opposite electrode (common electrode) 74 opposite to all the pixel electrodes 51. The common electrode 74 is a transparent electrode made from an ITO film, for example, and provided in place of the signal electrodes 56 in the display panel 50.

The signal lines 76 are coupled at an end thereof to a source driver circuit 60 so that they can be fed with a display signal from the source driver circuit 60 to display those pixels in the row addressed by the gate driver circuit 59. The common electrode 74 is coupled to an opposite electrode driver circuit 81 so that the common electrode 74 has its potential set by the opposite electrode driver circuit 81 to those values to which the potential of the common electrode 74 should be set to produce a display in accordance with a display signal. If the liquid crystal layer 58 is driven by AC voltage, the potential of the common electrode 74 is reversed periodically.

The gate driver circuit 59, the source driver circuit 60, and the opposite electrode driver circuit 81 constitute the display panel driver circuit 21 in FIG. 1, and combine with the display panel 70 to constitute a liquid crystal display. The common electrode 74 is also connected to a pulse generator circuit 64 via a capacitor 62.

As far as display is concerned, the operation of the I/O-integrated display 1 incorporating the display panel 70 is almost identical to that of the I/O-integrated display 1 incorporating the display panel 50, except that the signal applied to the signal lines 76 and the signal applied to the common electrode 74 are transposed.

In the I/O-integrated display 1 incorporating the display panel 70, the pulse generator circuit 64 functions as the signal applying circuit 13a in FIG. 1. The pulse generator circuit 64 applies an input sensing signal and a coordinate recognizing signal to the common electrode 74 via the capacitor 62 in accordance with the input-sensing digital code and the coordinate recognition digital code from the code generator circuit 13b in FIG. 1.

In this manner, in the display panel 70, the common electrode 74 functions as the panel electrode 11c in FIG. 1.

In this case, a frame period (vertical period) is again time-divided into a display period during which the display panel 70 displays an image and non-display periods including a vertical blanking period. The common electrode 74 receives an input sensing signal and a coordinate recognizing signal during a non-display period.

The I/O-integrated display 1 incorporating the display panel 70 is able to sense an input based on an input sensing signal as in embodiment 1. However, the I/O-integrated display 1 fails to recognize coordinates as in embodiment 1, because the display panel 70 utilizes a common electrode 74 which is common across the plane, not divided with respect to the x-direction.

Figure 16:
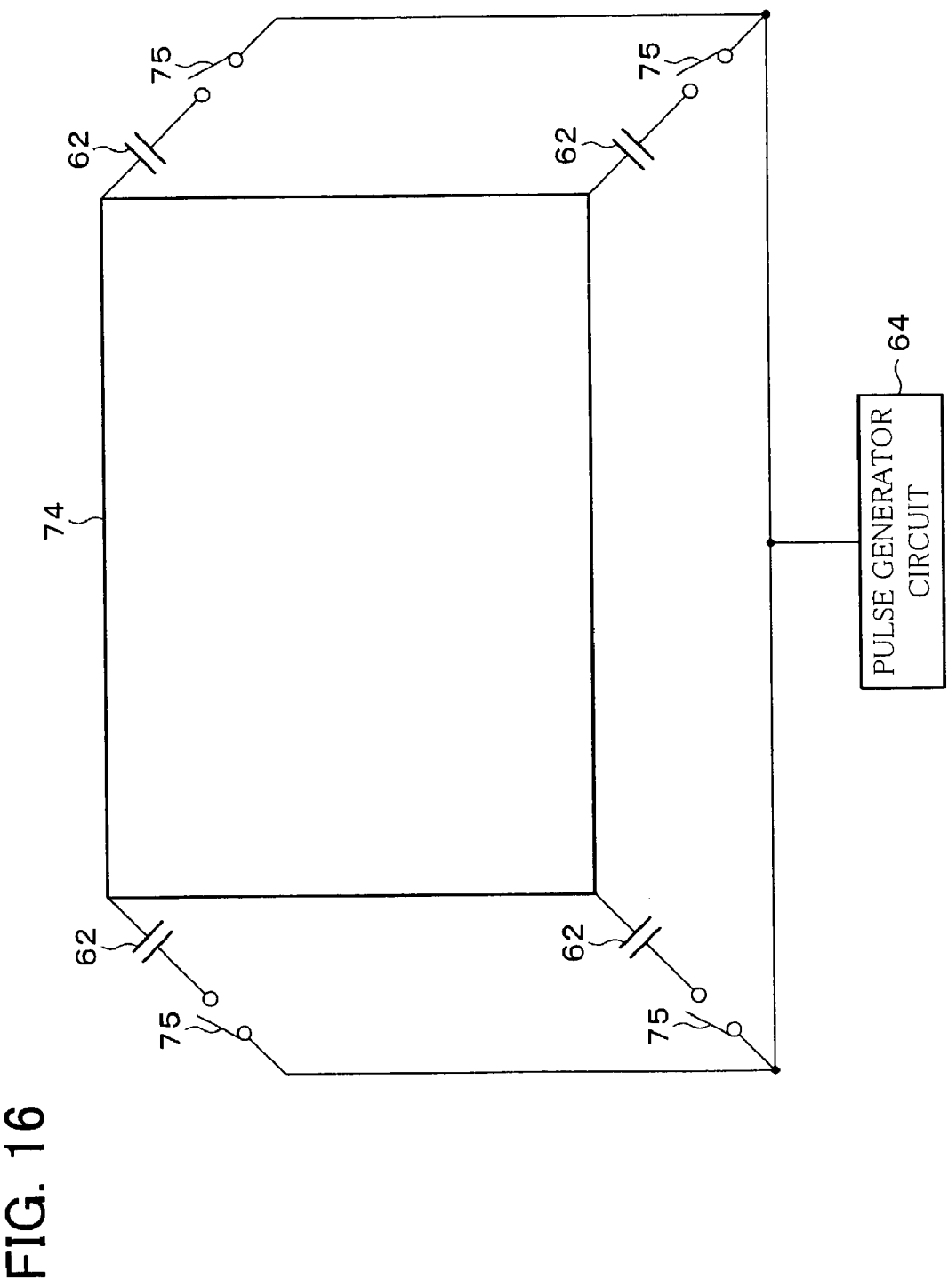
FIG. 16 is an explanatory drawing illustrating a method of recognizing coordinates on the display panel in FIG. 14.

Coordinates are recognizable on the display panel 70 by, for example, as shown in FIG. 16, applying a coordinate recognizing signal from the pulse generator circuit 64 to a plurality of positions (at least three points) on the common electrode 74 via the associated capacitors 62 at different times and sensing the peak amplitudes of the detection signals corresponding to the coordinate recognizing signal applied at different times. To apply a coordinate recognizing signal at different times, it would be sufficient if there are switching elements 75 provided between the capacitors 62 and the pulse generator circuit 64.

With a coordinate recognizing signal applied to a plurality of positions, the detection signals have a peak amplitude which varies depending on the distance between the position where the signal is applied and the position where the input tip 12b in the stylus 12 is brought into contact with the display panel 70; the coordinates can be thereby determined. Note however that the accuracy of the recognized coordinates likely to be low, compared to embodiment 1.

In the present embodiment, the pulse generator circuit 64 as the signal supply section 13 also supplies an input sensing signal and a coordinate recognizing signal to the common electrode 74 during a non-display period of the display panel 70. This prevents the supply of an input sensing signal and a coordinate recognizing signal from disturbing the display.

It is preferable if the other electrodes and wires of the display panel 70, including the scan lines 53 and the signal lines 76, are held at a constant potential while the pulse generator circuit 64 is supplying an input sensing signal and a coordinate recognizing signal to the common electrode 74. If the potentials of the other electrodes and wires change, the potential change may generate noise on detection signals.

Especially, the signal lines 76 are likely to produce noise, due to relatively large potential changes that occur on the signal lines 76 when the liquid crystal layer 58 is driven. It is therefore preferable if the signal lines 76, among other lines, are held at a constant potential. Thus, by allowing no potential changes to occur on the signal lines 76 which would be a likely cause to produce noise on the detection signal, noise is prevented from being present in the detection signal.

The above description has assumed that the display panel 70 in FIG. 14 is used for the I/O-integrated display 1 in FIG. 1; alternatively, the display panel 70 may be used for the I/O-integrated display 1a in FIG. 7 or the I/O-integrated display 1b in FIG. 8, in which event, the coordinates are recognizable by obtaining and using a detection signal from a plurality of positions on the common electrode 74 through the signal detecting circuit 14.

As in embodiment 1 or 2 above, the input receiving panel 11a in FIG. 1 makes up a part of the display panel 11b.

Possible alternatives include various types of tablet-integrated displays in which separately fabricated components, an input receiving panel 11a based on a transparent tablet and a display panel 11b, are combined. Typical tablet-integrated displays depend on a resistor film for operation.

In those typical tablet-integrated displays, a transparent tablet as the input receiving panel 11a is placed at the front of the display panel 11b. In this manner, I/O-integrated displays 1 including a separately fabricated input receiving panel 11a and display panel 11b have increased weight and size (thickness) and require additional steps in manufacture to combine the input receiving panel 11a and the display panel 11b. Further, the input receiving panel 11a, although transparent, is inserted between the display panel 11b and the stylus 12, resulting in increased surface reflection and decreased brightness, thus, poorer visibility. Besides, the insertion of the input receiving panel 11a adds to the distance by which the input tip 12b in the stylus 12 is separated from the display section of the display panel 11b and hence to parallax, resulting again in poorer display quality.

In contrast, in capacitive coupling, the input receiving panel 11a may be constructed as part of the display panel 11b as in embodiments 1 and 2. The construction reduces the device in weight and size (thickness) and allows for a simplified device manufacturing process. It also prevents poorer display brightness, reduces parallax due to the distance between the input means and the display panel, and prevents display quality deterioration in other ways too.

Attention should be paid in capacitive coupling, however, to the problem of false sensing as detailed earlier in the "Background of the Invention." Embodiments 1 and 2 so greatly reduces the likelihood of false sensing by the use of the input devices 2, 2a, 2b in accordance with the present invention, that they could be said to have successfully addressed the disadvantage of capacitive coupling.

When the input receiving panel 11a is constructed as part of the display panel 11b in this manner, it is preferable if the input sensing signal and the coordinate recognizing signal are supplied during a non-display period of the display panel 11b. This prevents the supply of an input sensing signal from disturbing a display.

When an input sensing signal and a coordinate recognizing signal are supplied, it is preferable if the electrodes and wires in the display panel 11b other than the electrodes to which the signals are supplied are held at a constant potential. This prevents noise from being superimposed on the detection signal.

Embodiments 1 and 2 assumed active matrix liquid crystal displays; alternatively, any other drive scheme, such as passive matrix, may be employed so long as the scheme is capable of inputting an electrode with a position detecting signal and a coordinate recognizing signal and sensing an input signal on the panel surface. The display is not limited to the liquid crystal display, but may be an organic EL display, a plasma display, or a like device.

In the description above, in reference to FIG. 1 to FIG. 16, the x- and y-coordinates were recognized by the use of a detection signal produced by capacitive coupling. The following will describe a scheme whereby coordinates are recognized using ultrasound ("ultrasound stylus input scheme").

First, conventional ultrasound stylus input schemes will be described in reference to FIG. 27 to FIG. 33.

An example of such an ultrasound stylus input scheme is illustrated in FIG. 27(a): a stylus input unit 151 is located near an input receiving panel 150 and provided with two ultrasound receivers 152, 153 and an infrared light receiver 154. Referring to FIG. 27(b), an input stylus 170 is provided with an ultrasound transmitter 171 and an infrared light transmitter 172. At the tip of the input stylus 170, there is provided a contact sensing switch 173.

The following will assume that the input receiving panel and the display panel are constructed integrally.

Figure 28:
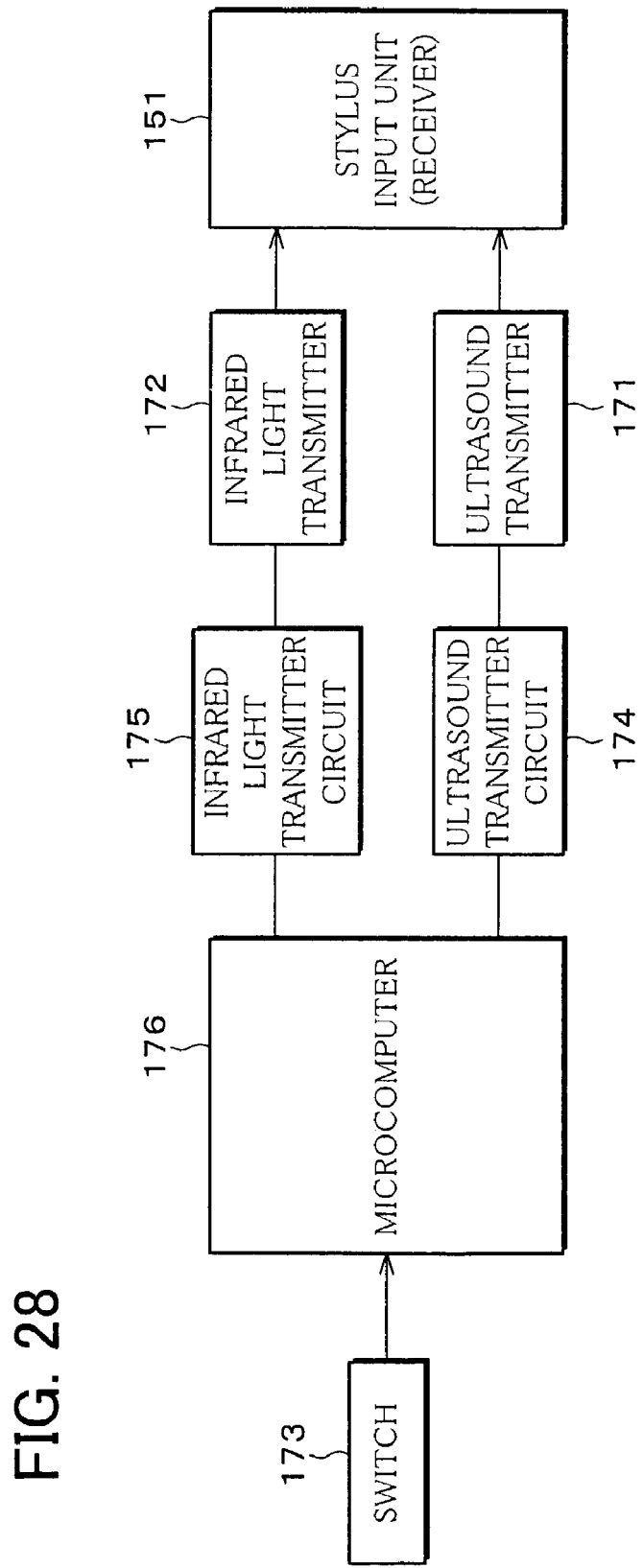
FIG. 28 is a block diagram showing a configuration of the stylus in FIG. 27(b).

Referring to FIG. 28, the stylus 170 has a built-in microcomputer 176 controlling output of an ultrasound transmitter 171 and an infrared light transmitter 172 through an ultrasound transmitter circuit 174 and an infrared light transmitter circuit 175 respectively.

The control of the microcomputer 176 causes the ultrasound transmitter 171 and the infrared light transmitter 172 to send a signal when the contact sensing switch 173 on the tip of the stylus is turned on in response to the stylus 170 being brought into contact with the input receiving panel 150. The ultrasound transmitter 171, the infrared light transmitter 172, the ultrasound transmitter circuit 174, the infrared light transmitter circuit 175, and the microcomputer 176 are powered by a built-in battery (not shown) in the stylus 170.

Calculation of an input position (i.e., a coordinate recognizing method) will be described according to the ultrasound stylus input scheme arranged in this manner.

Figure 29:
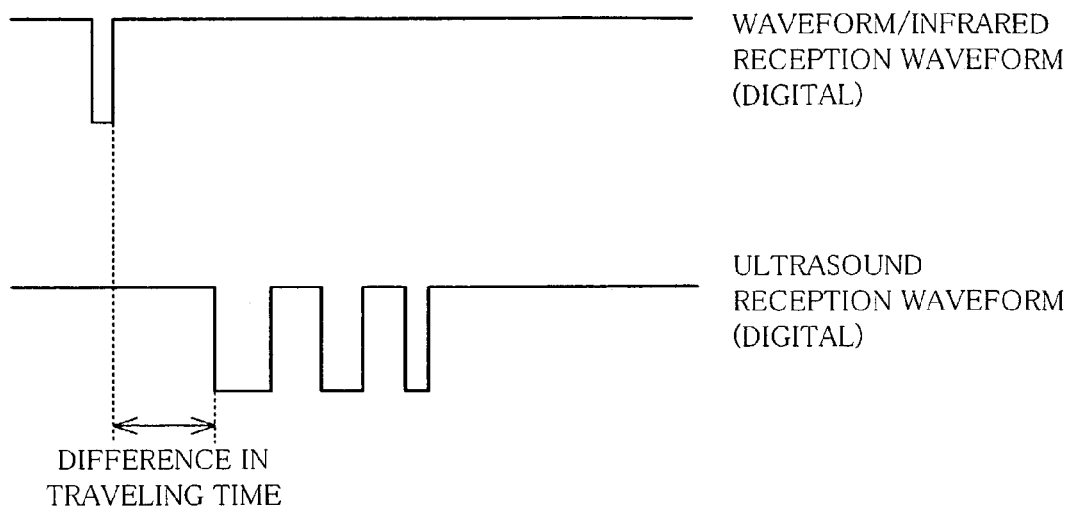
FIG. 29 is a timing chart showing a waveform of ultrasound and infrared light in relation to the ultrasound stylus input device in FIG. 27(a).

In response to a contact of the stylus 170 with the input receiving panel 150, the built-in contact sensing switch 173 on the stylus tip is turned on, simultaneously causing the ultrasound transmitter 171 to send an ultrasound signal and the infrared light transmitter 172 to send an infrared signal. The signal traveling time from transmission to reception of the ultrasound signal is measured for each of the ultrasound receivers 152, 153. In this situation, the infrared signal is regarded as having reached the infrared light receiver 154 in zero time after its emission; as shown in FIG. 29, the signal traveling time is measured starting when the infrared signal is received.

The signal traveling time of an ultrasound signal can be determined using, for example, a counter. Specifically, the traveling times of an ultrasound signal from its emission from the ultrasound transmitter 171 to reception at the ultrasound receivers 152, 153 are determined by counting a clock and multiplying the clock count by the clock cycle.

Multiplying the signal traveling times to the ultrasound receivers 152, 153 by the propagation speed of the ultrasound signal, i.e., sound velocity, one can obtain the distances between the ultrasound transmitter 171 and the ultrasound receivers 152, 153 at that moment. The distance between the ultrasound receiver 152 and the ultrasound receiver 153 is recognized in advance.

Figure 30:
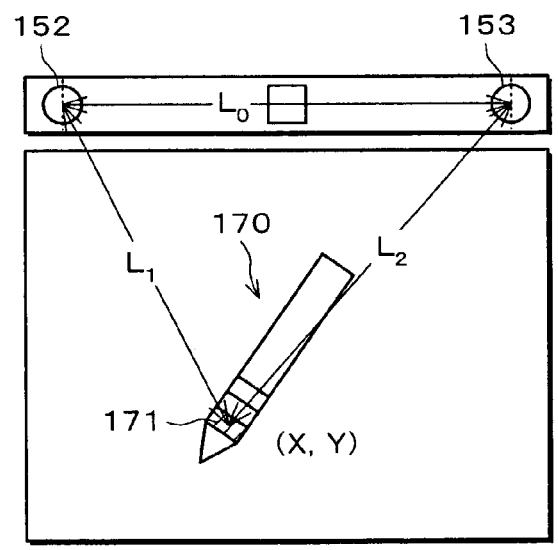
FIG. 30 is an explanatory drawing illustrating an approach to determine input coordinates in relation to the ultrasound stylus input device in FIG. 27(a).

Having obtained distance L1 between the ultrasound transmitter 171 and the ultrasound receiver 152, distance L2 between the ultrasound transmitter 171 and the ultrasound receiver 153, and distance L0 between the ultrasound receiver 152 and the ultrasound receiver 153 in the foregoing as shown in FIG. 30, the position of the ultrasound transmitter 171 is identified based on the three distances by the position coordinates (X, Y) of a point on the input receiving panel 150. The detected coordinate position of the ultrasound transmitter 171 obtained in this manner is used as the stylus tip coordinate position.

Operation related to the calculation of the input position (detected coordinate position) will be described in more detail in reference to FIG. 31 and FIG. 32.

Figure 31:
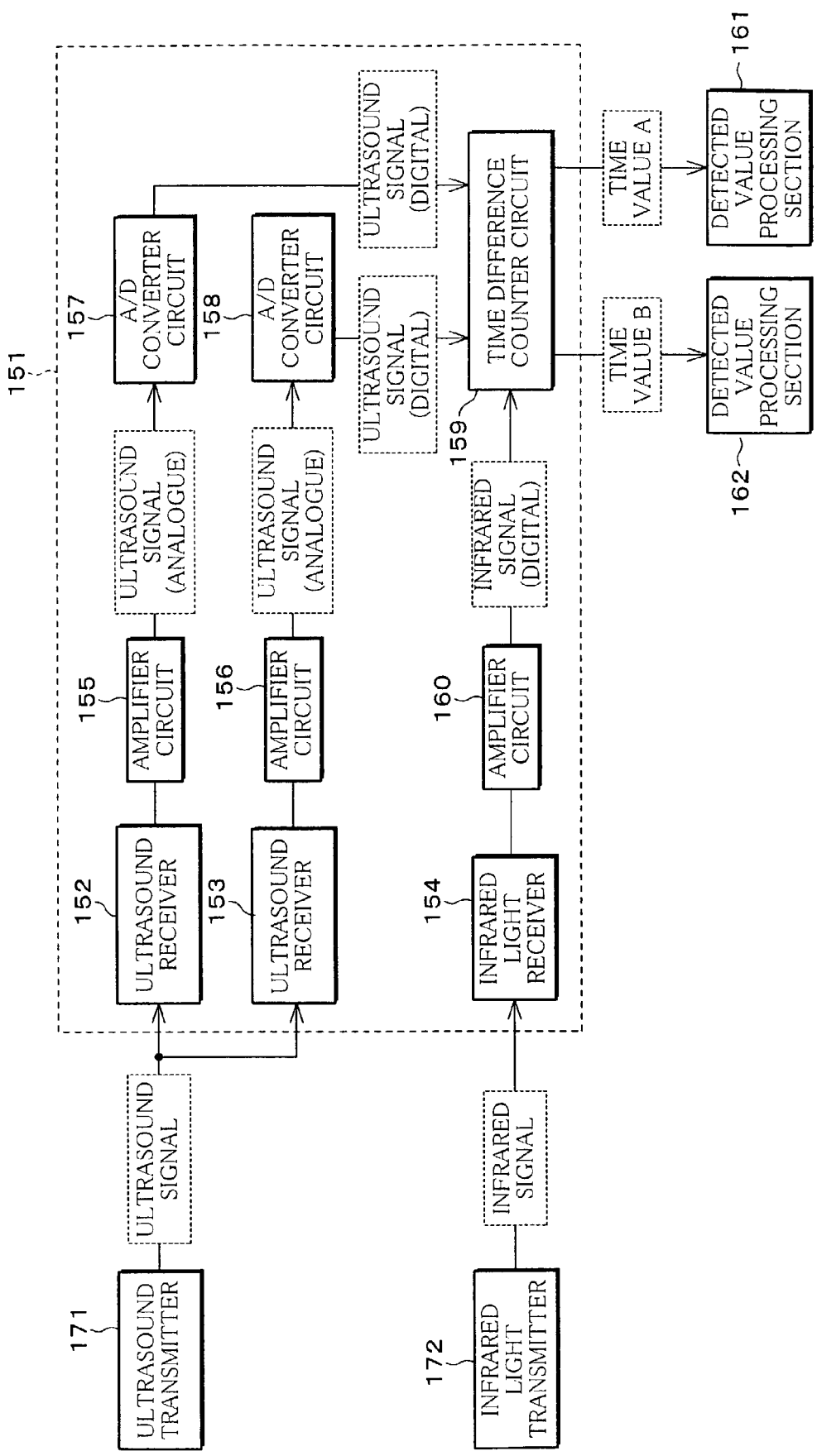
FIG. 31 is a block diagram primarily showing a configuration of a stylus input unit in the ultrasound stylus input device in FIG. 27(a).

Referring to FIG. 31, an ultrasound signal emitted by the ultrasound transmitter 171 on the stylus 170 is received by the ultrasound receivers 152, 153 on the stylus input unit 151. The received waveforms are amplified by amplifier circuits 155, 156, converted from analogue to digital by A/D converter circuits 157, 158, and fed to a traveling time difference counter circuit 159.

The infrared signal emitted by the infrared light transmitter 172 simultaneously with the ultrasound signal is received by the infrared light receiver 154 on the stylus input unit 151, amplified by an amplifier circuit 160, and fed to the traveling time difference counter circuit 159 as is the ultrasound signal.

The traveling time difference counter circuit 159 detects a signal traveling time from the waveforms of the incoming ultrasound and infrared signals. Specifically, signal traveling times A, B corresponding respectively to the waveforms received by the ultrasound receivers 152, 153 are fed to the detected time processing sections 161, 162 respectively.

Figure 32:
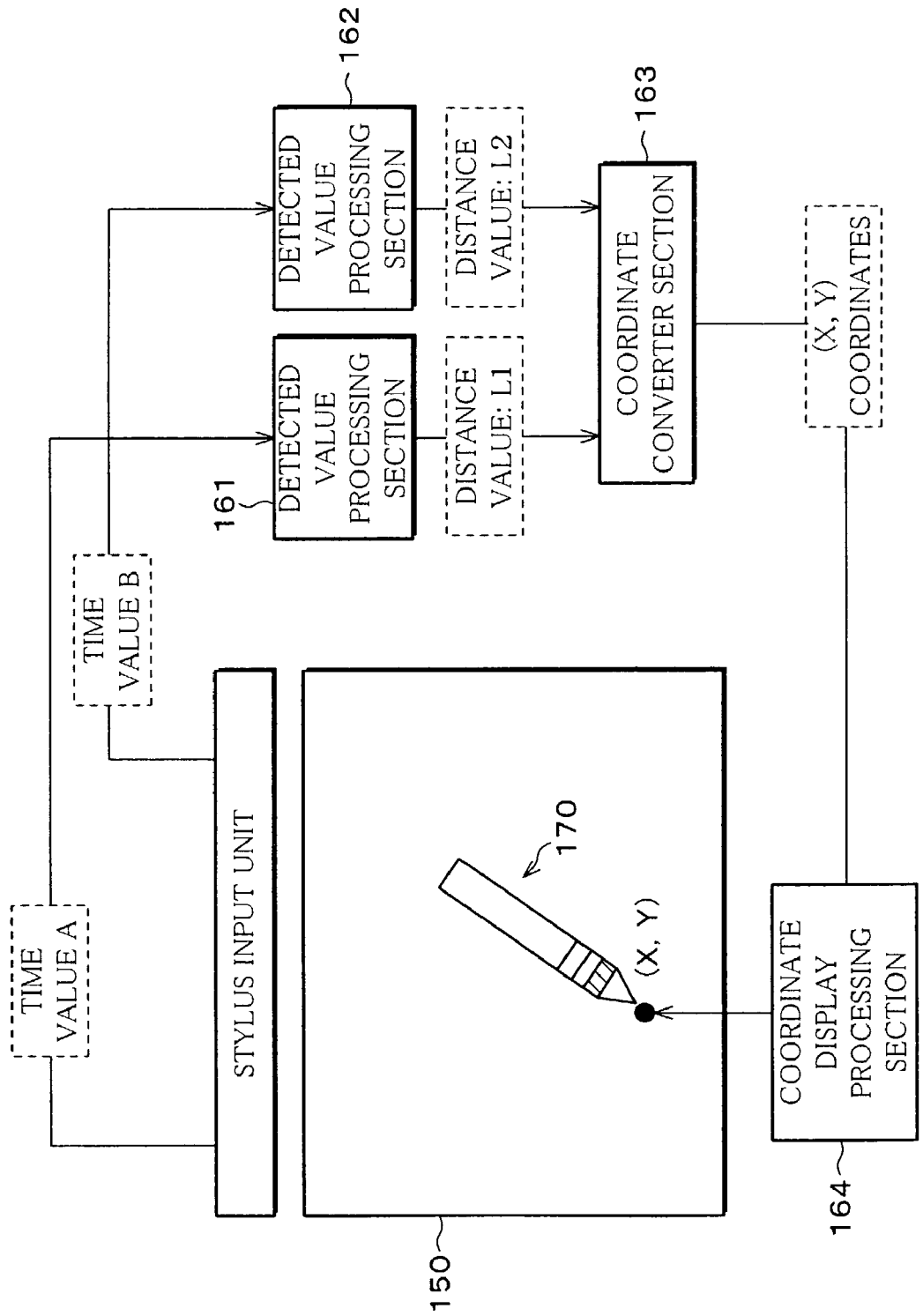
FIG. 32 is a block diagram showing an input coordinate display configuration of the ultrasound stylus input device in FIG. 27(a).

Times A, B transmitted from the traveling time difference counter circuit 159 in the stylus input unit 151 are converted to distances L1, L2 by calculation by the detected value processing sections 161, 162 respectively as shown in FIG. 32. Thereafter, the distances L1, L2 are converted to x- and y-coordinates on the display panel (input receiving panel 150) by the coordinate converter section 163, and displayed as position coordinates on the display panel by a coordinate display processing section 164.

The foregoing ultrasound stylus input scheme requires no transparent tablet to be placed before the input receiving panel 150, is free from parallax which could otherwise occur in a stylus input, and enables a stylus input while maintaining good display quality with no transmittance-degrading transparent tablet.

Nevertheless, the ultrasound stylus input scheme raises the same problem as capacitive coupling: when the contact sensing switch 173 on the tip of the stylus 170 is turned on in response to the contact of the stylus 170 with something other than the input receiving panel 150, the ultrasound transmitter 171 and the infrared light transmitter 172 produce a signal, leading to false sensing.

No false sensing occurs if the contact sensing switch 173 on the stylus tip is on when it is on the input receiving panel 150 as shown in FIG. 33(a). In contrast, false sensing does occur if the contact sensing switch 173 is turned on in response to a contact of the stylus tip with a place other than the input receiving panel 150 as shown in FIG. 33(b).

Therefore, when coordinates are recognized by a ultrasound stylus input scheme, it is again necessary to recognize whether or not the tip of the stylus 170 is on the input receiving panel 150.

Accordingly, the following will describe an I/O-integrated display capable of preventing false sensing in an ultrasound stylus input scheme by recognizing whether the tip of the stylus 170 is on the input receiving panel 150, in reference to FIGS. 19-26, and 34.

Figure 19:
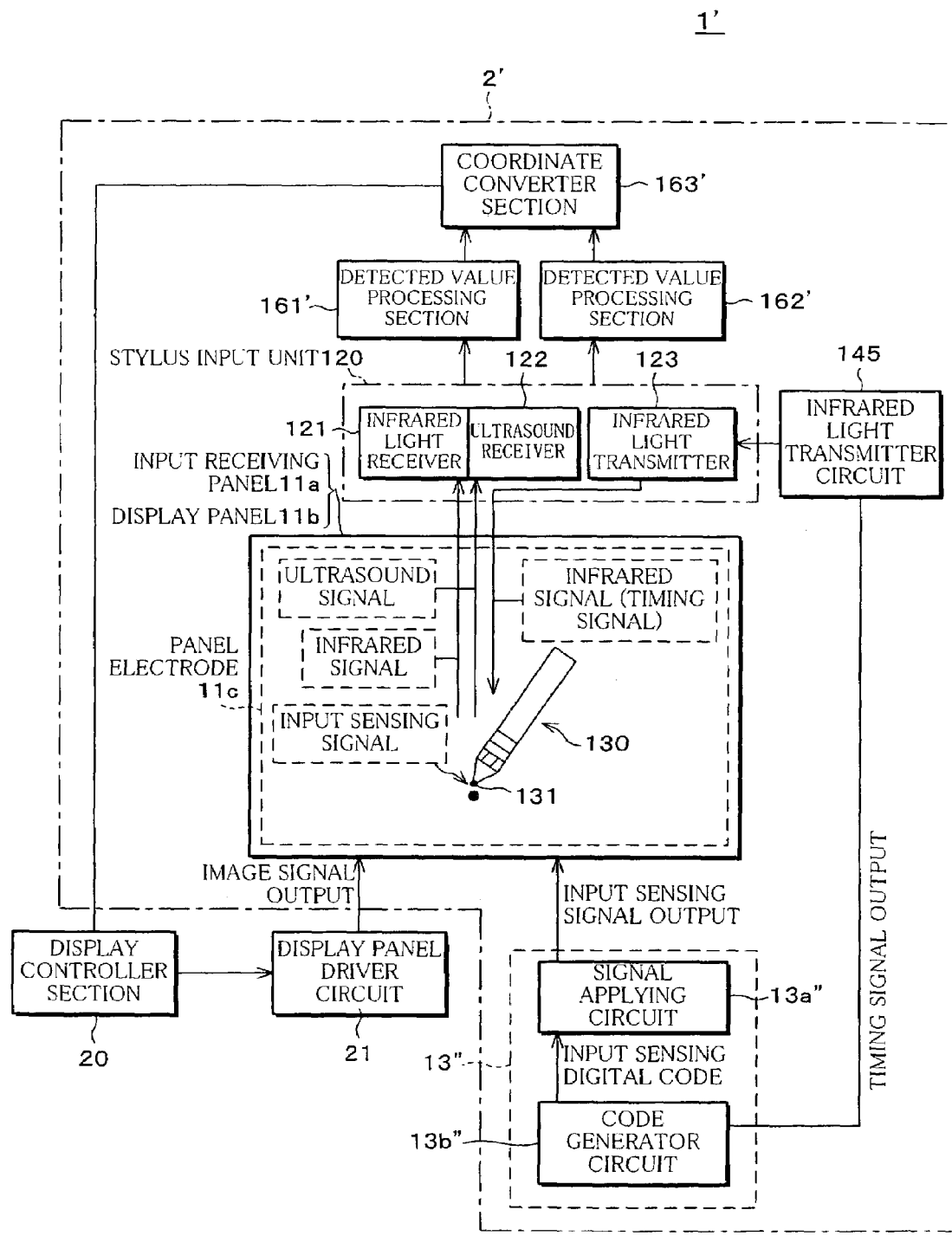
FIG. 19 is a block diagram showing a configuration of another I/O-integrated display of an embodiment in accordance with the present invention.

FIG. 19 is a block diagram schematically showing a configuration of an I/O-integrated display 1' which includes, as shown in FIG. 19, an input device 2', a display controller section 20, and a display panel driver circuit 21. The display controller section 20 and the display panel driver circuit 21 here are identical to those in FIG. 1 and other drawings; description is omitted about their details.

The input device 2' includes an input receiving panel 11a identical to that shown in FIG. 1 and a stylus 130 which enables an input on the input receiving panel 11a. Similarly to the input device 2, the input device 2' senses an input by means of capacitive coupling between a panel electrode (first electrode) 11*c* in the input receiving panel 11*a* and a stylus electrode (second electrode) 131 in the stylus 130.

The input device 2' further includes a stylus input unit 120, a signal supply section (first signal supply means) 13", an infrared light transmitter circuit 145, a detected value processing sections 161', 162', and a coordinate converter section 163'.

The detected value processing sections 161', 162', and the coordinate converter section 163' have identical functions as the detected value processing sections 161, 162 and the coordinate converter section 163 respectively which were detailed in the description of a conventional ultrasound stylus input scheme example; description thereof is therefore omitted. The stylus 130 and the stylus input unit 120 will be detailed later.

The signal supply section 13" includes a signal applying circuit 13*a*" applying an input sensing signal, which is an analogue voltage signal, to the panel electrode 11*c*, and a code generator circuit 13*b*" generating an input-sensing digital code superimposed on the input sensing signal. As the code generator circuit 13*b*" feeds an input-sensing digital code, a prescribed permutation of 1s and 0s, to the signal applying circuit 13*a*", the signal applying circuit 13*a*" outputs a serial rectangular wave where, for example, a HIGH and LOW represent a "1" and "0" of the input-sensing digital code respectively. The code generator circuit 13*b*" transmits a timing signal to the infrared light transmitter circuit 145.

The signal supply section 13" differs from the signal supply section 13 in FIG. 1 and other drawings in the following points.

Firstly, the signal supply section 13 applies an input sensing signal and a coordinate recognizing signal to the panel electrode 11*c*, whereas the signal supply section 13" applies only an input sensing signal to the panel electrode 11*c*. Second, the signal supply section 13 transmits a timing signal and an input-sensing digital code to the input sensing section 15, whereas the signal supply section 13" transmits a timing signal to the infrared light transmitter circuit 145. The signal supply section 13 and the signal supply section 13" share identical functions in other regards; description there of is omitted.

The infrared light transmitter circuit 145, as will be detailed later, is a circuit which transmits a received timing signal to the infrared light transmitter 123 on the stylus input unit 120.

Figure 20:
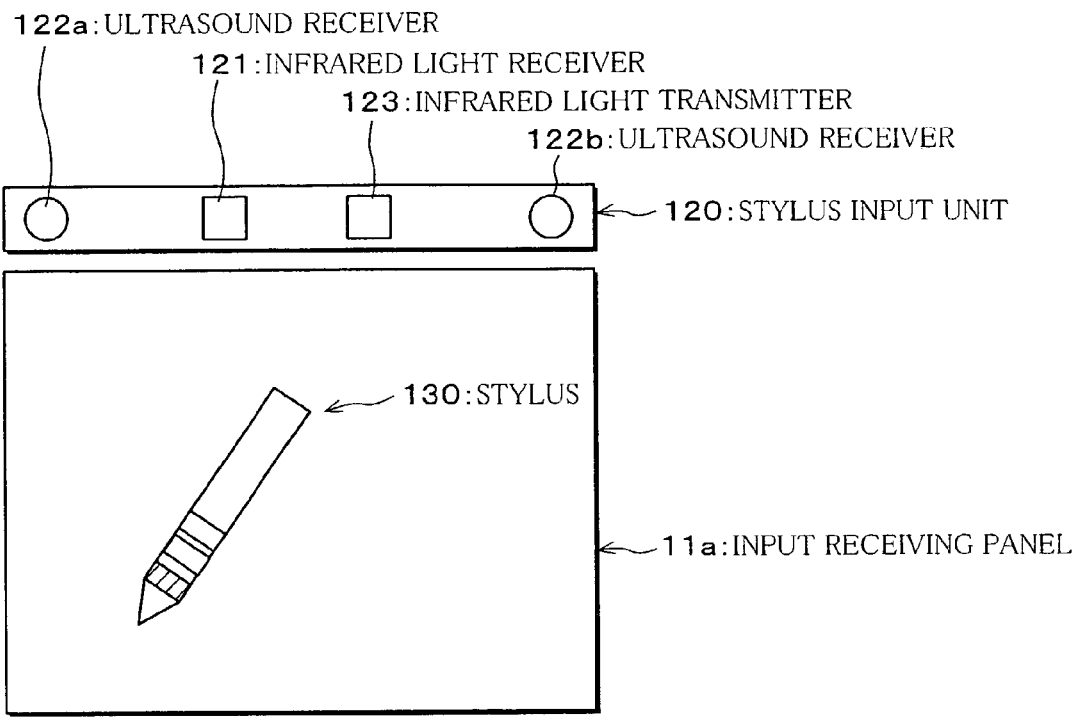
FIG. 20 is a schematic illustration showing a configuration of the I/O-integrated display in FIG. 19.

The stylus input unit 120 includes an infrared light receiver 121, an ultrasound receiver 122, and an infrared light transmitter 123 as shown in FIG. 19. More specifically, as shown in FIG. 20, it includes two ultrasound receivers (122*a*, 122*b*). So, the stylus input unit 120 has an infrared light transmitter, while the conventional stylus input unit 151 illustrated in FIG. 27(*a*) does not. The stylus input unit 120 is located around the input receiving panel 11*a*.

Figure 21:
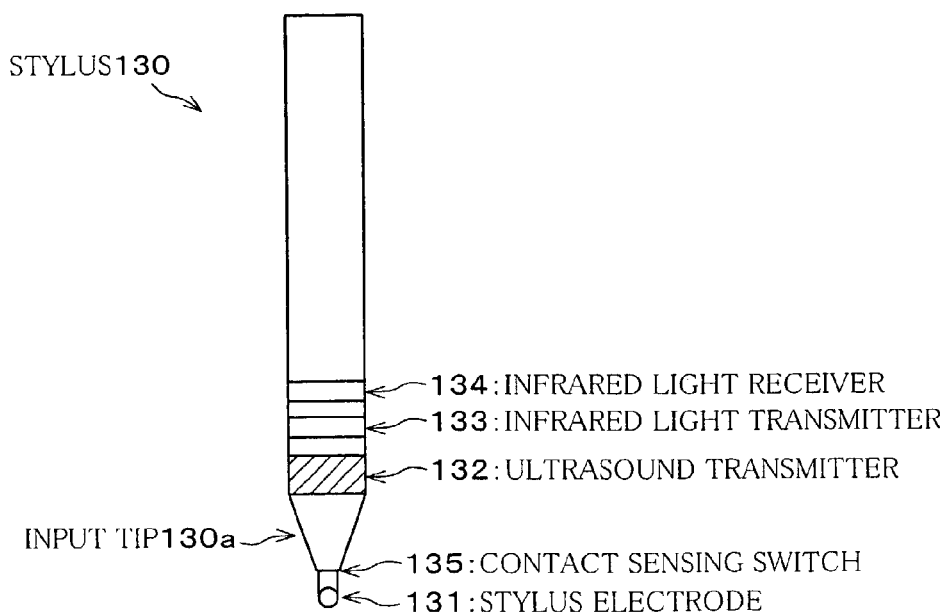
FIG. 21 is an explanatory drawing illustrating a stylus of the I/O-integrated display in FIG. 19.
Figure 22:
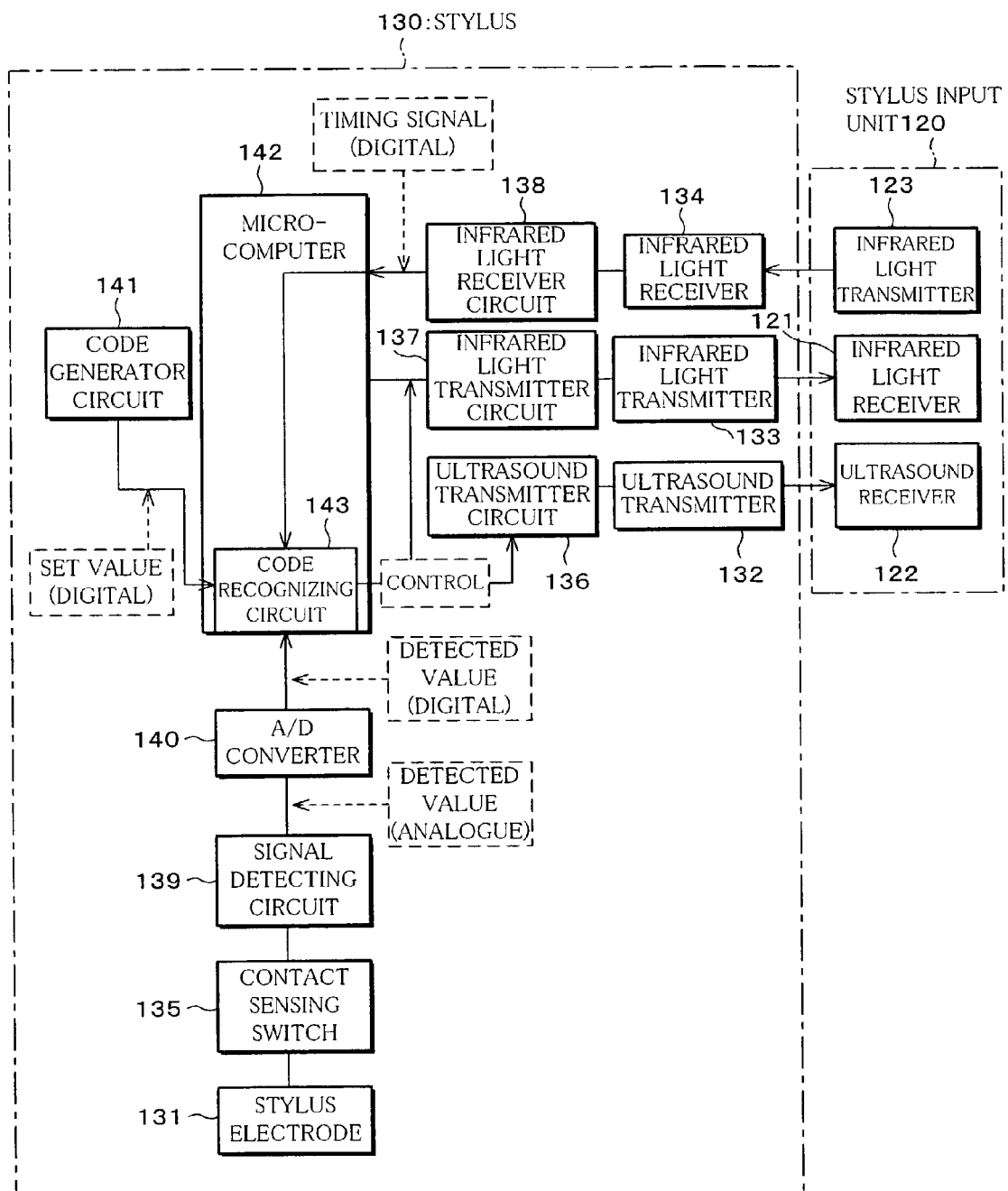
FIG. 22 is a block diagram of a stylus and a stylus input unit of the I/O-integrated display in FIG. 19.

Next, the stylus 130 will be described in terms of structure in reference to FIG. 21 and FIG. 22. FIG. 21 is an explanatory drawing illustrating schematically showing the structure of the stylus 130. FIG. 22 is a block diagram showing the structure of the stylus 130 and the stylus input unit 120.

The stylus 130 includes an ultrasound transmitter 132, an infrared light transmitter 133, and an infrared light receiver 134, and its tip forms a contact sensing switch 135, as shown in FIG. 21. The stylus tip is provided with a stylus electrode 131 as mentioned in the foregoing. So, the stylus 130 has the infrared light receiver 134 and the stylus electrode 131 whereas the conventional stylus 170 in FIG. 27(*b*) does not. The stylus electrode 131 will be detailed later. The tip of the stylus 130 will be referred to as the input tip 130*a*.

The stylus 130 is adopted to be able to sense a contact of the input tip 130*a* with an object through the contact sensing switch 135.

Further, as shown in FIG. 22, the stylus 130 includes an ultrasound transmitter circuit 136, an infrared light transmitter circuit 137, an infrared light receiver circuit 138, a signal detecting circuit (signal detecting means) 139, an A/D converter 140, a code generator circuit (signal generator means) 141, and a microcomputer 142. The microcomputer 142 has a code recognizing circuit (input sensing means) 143 therein.

The stylus electrode 131, the contact sensing switch 135, and the signal detecting circuit 139 achieve the same functions as the stylus electrode 12*a*, the contact sensing switch 12*c*, and the signal detecting circuit 14 in FIG. 1 respectively.

The infrared light receiver 134 on the stylus 130 receives a timing signal from the infrared light transmitter 123 on the stylus input unit 120 by infrared light communication. The infrared light receiver 134 feeds the received signal to the infrared light receiver circuit 138 from which the timing signal is sent to the code recognizing circuit 143.

The signal detecting circuit 139 detects a change in potential of the stylus electrode 131 as an analogue detection signal and outputs the detection signal after suitable amplification and other processes for transmission. The signal detecting circuit 139 only needs to detect a change in potential of the stylus electrode 131 as an analogue detection signal and feed the signal to the code recognizing circuit 143; it does not necessarily perform amplification and other processes. Therefore, when the panel electrode 11*c* is receiving an input sensing signal and capacitively coupled with the stylus electrode 131, the signal detecting circuit 139 outputs an input sensing signal induced in the stylus electrode 131 as a detection signal.

The A/D converter 140 converts the analogue detection signal detected by the signal detecting circuit to a digital signal and transmits it to the code recognizing circuit 143.

Figure 23:
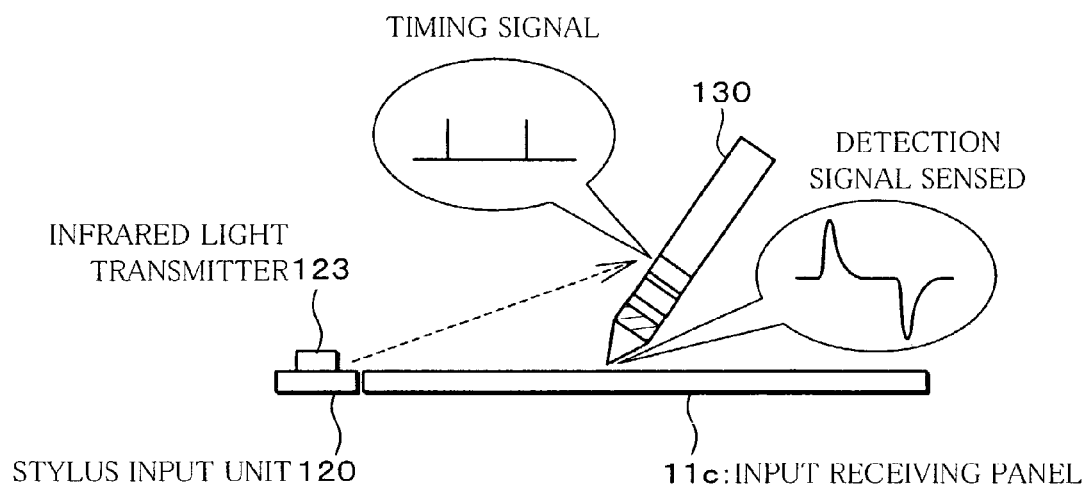
FIG. 23 is an explanatory drawing illustrating a signal received by the stylus of the I/O-integrated display in FIG. 19.
Figure 24:
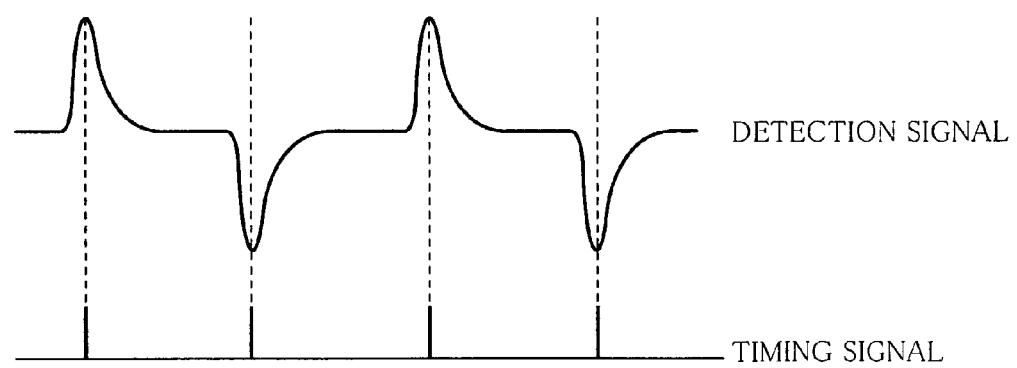
FIG. 24 is a timing chart showing a relationship between a detection signal and a timing signal in the I/O-integrated display in FIG. 19.
Figure 27:
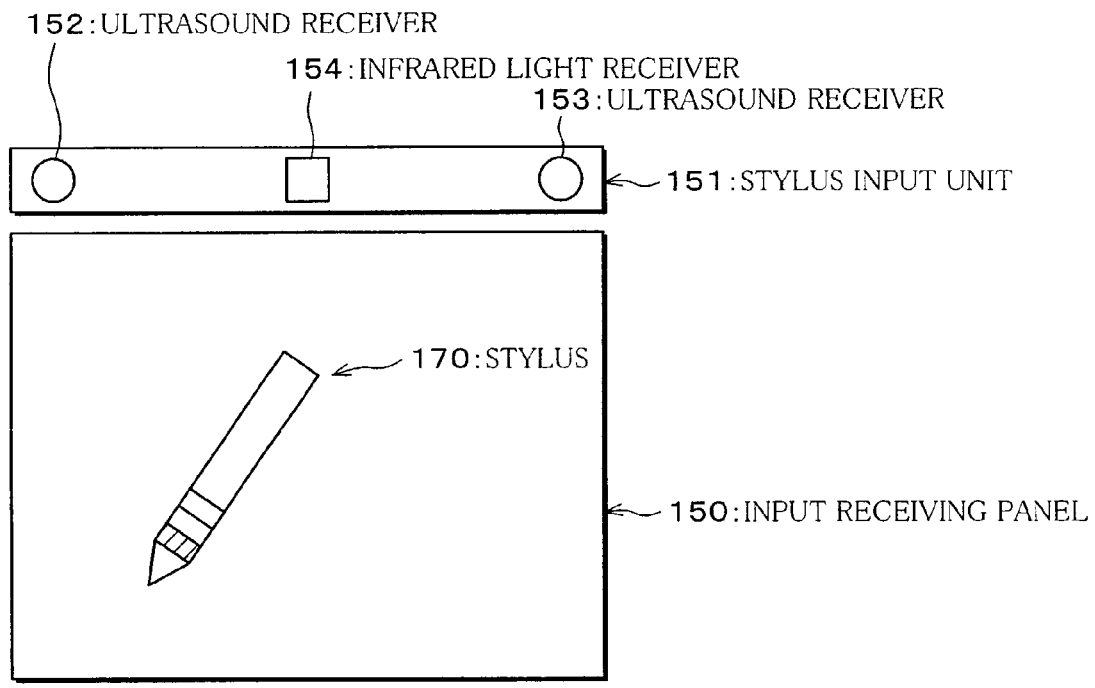
FIG. 27(a) is schematic illustration showing a configuration of a conventional ultrasound stylus input device.
FIG. 27(b) is an explanatory drawing showing a stylus for use with the ultrasound stylus input device.
Figure 27:
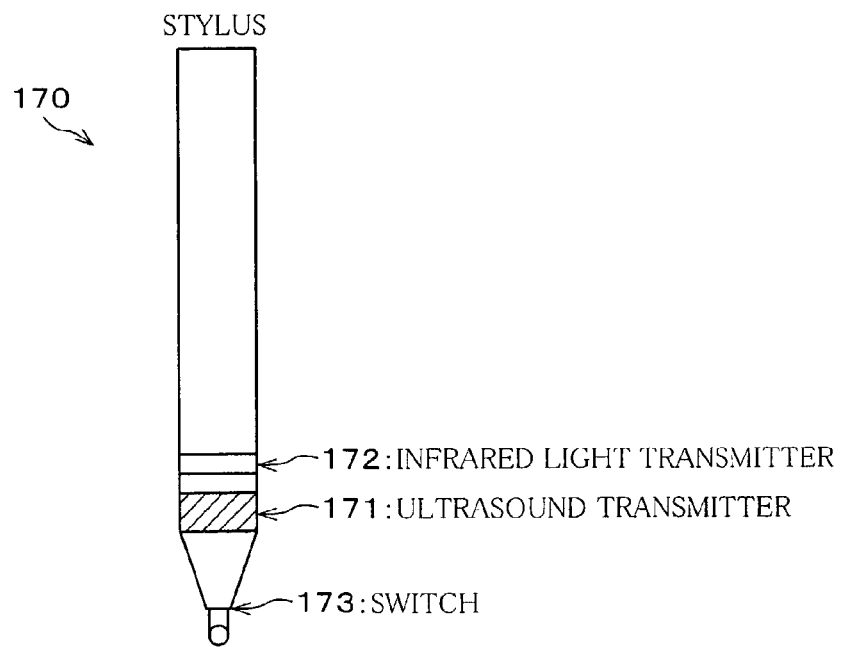

In other words, the stylus 130 receives a timing signal from the infrared light transmitter 123 on the stylus input unit 120 by infrared light communication and an input detection signal from the input receiving panel 11*a*, as shown in FIG. 23. From the detection signal and the timing signal, the stylus 130 determines the detection code as shown in FIG. 24. The same method here by which the detection code is determined from the detection signal and the timing signal is identical to that described in reference to FIG. 2, and description thereof is omitted. As described in the foregoing, the means for determining a detection code (digital code) from a detection signal is referred to as the code detecting means.

The code generator circuit 141 has an equivalent function to the code generator circuit 13*b*" in the signal supply section 13", supplying an input-sensing digital code (another sensing signal) identical with the one generated by the code generator circuit 13*b*" in the signal supply section 13" to the code recognizing circuit 143.

The code recognizing circuit 143 compares the detection code determined from a timing signal and an input detection signal with the input-sensing digital code; if the detection code does not match with the input-sensing digital code, as shown in FIG. 25, the stylus 130 does not send an ultrasound or infrared light to the stylus input unit 120.

In contrast, if the detection code matches with the input-sensing digital code, the stylus 130 sends an ultrasound and infrared light to the stylus input unit 120 as shown in FIG. 25.

More specifically, referring to FIG. 22, the ultrasound transmitter circuit 136 generates an ultrasound, and the ultrasound transmitter 132 transmits the ultrasound signal to the ultrasound receiver 122 on the stylus input unit 120. Also, the infrared light transmitter circuit 137 generates infrared light, and the infrared light transmitter 133 transmits the infrared light to the infrared light receiver 121 on the stylus input unit 120.

The means in the code recognizing circuit 143 for determining whether the detection code and the input-sensing digital code matches will be hereinafter referred to as the determining means.

As described in the foregoing, once the tip (input tip 130*a*) of the stylus 130 touches the input receiving panel 11*a* and turns on the contact sensing switch 135, and the detection code matches with the input-sensing digital code, an input coordinate becomes detectable as shown in FIG. 26(*a*), and at the same time the display panel 11*b* becomes able to display an image owing to the display controller section 20 and the display panel driver circuit 21 in FIG. 19.

If the stylus tip touches somewhere other than the input receiving panel 11*a*, but still turns on the contact sensing switch 135, the stylus 130 cannot obtain a detection code from the panel electrode 11*c*, causing the code recognizing circuit 143 to determine that the detection code does not match with the input-sensing digital code. No ultrasound nor infrared light is therefore transmitted to the stylus input unit 120 as shown in FIG. 26(*b*), preventing false sensing. Also, no display is produced on the display panel 11*b*.

As described in the foregoing, similarly to the aforementioned I/O-integrated display 1, etc. the I/O-integrated display 1' is capable of preventing unnecessary execution of coordinate recognizing processes triggered by noise, alleviating workload of the device.

Here, the input coordinates are detected using a similar approach to the one shown in FIG. 30. That is, in the conventional example, the input coordinates are detected by means of the ultrasound receivers 152, 153 on the stylus input unit 151 and the ultrasound transmitter 171 on the stylus 170, whereas in the input device 2' the input coordinates are detected by means of the ultrasound receivers 122*a*, 122*b* on stylus input unit 120 and the ultrasound transmitter 132 on the stylus 130.

The means for detecting the coordinate of the stylus 130 on the input receiving panel 11*a* in response to sensing of an input will be referred to as the coordinate detecting means. The coordinate detecting means includes a stylus input unit 120, a stylus 130, detected value processing sections 161', 162', and a coordinate converter section 163'.

The stylus 130 may be additionally provided with a circuit section for setting an input-sensing digital code generated by the code generator circuit 141 to any given value. For example, the stylus 130 may be provided with dial keys and "Enter" buttons for user manipulation to set the input-sensing digital code. Note, however, that in the above arrangement, settings must be made beforehand so that the input-sensing digital code matches with the detection code when the I/O-integrated display is to be used.

The input-sensing digital code may be made unique to the stylus 130. When this is the case, it would be sufficient if the input-sensing digital code is stored in a ROM (not shown) in the stylus 130 so that the input-sensing digital code stored in the ROM is available for readout by the code generator circuit 141. Note, however, that in this arrangement, the detection code needs to be set so as to match with the input-sensing digital code from the stylus 130.

Figure 34:
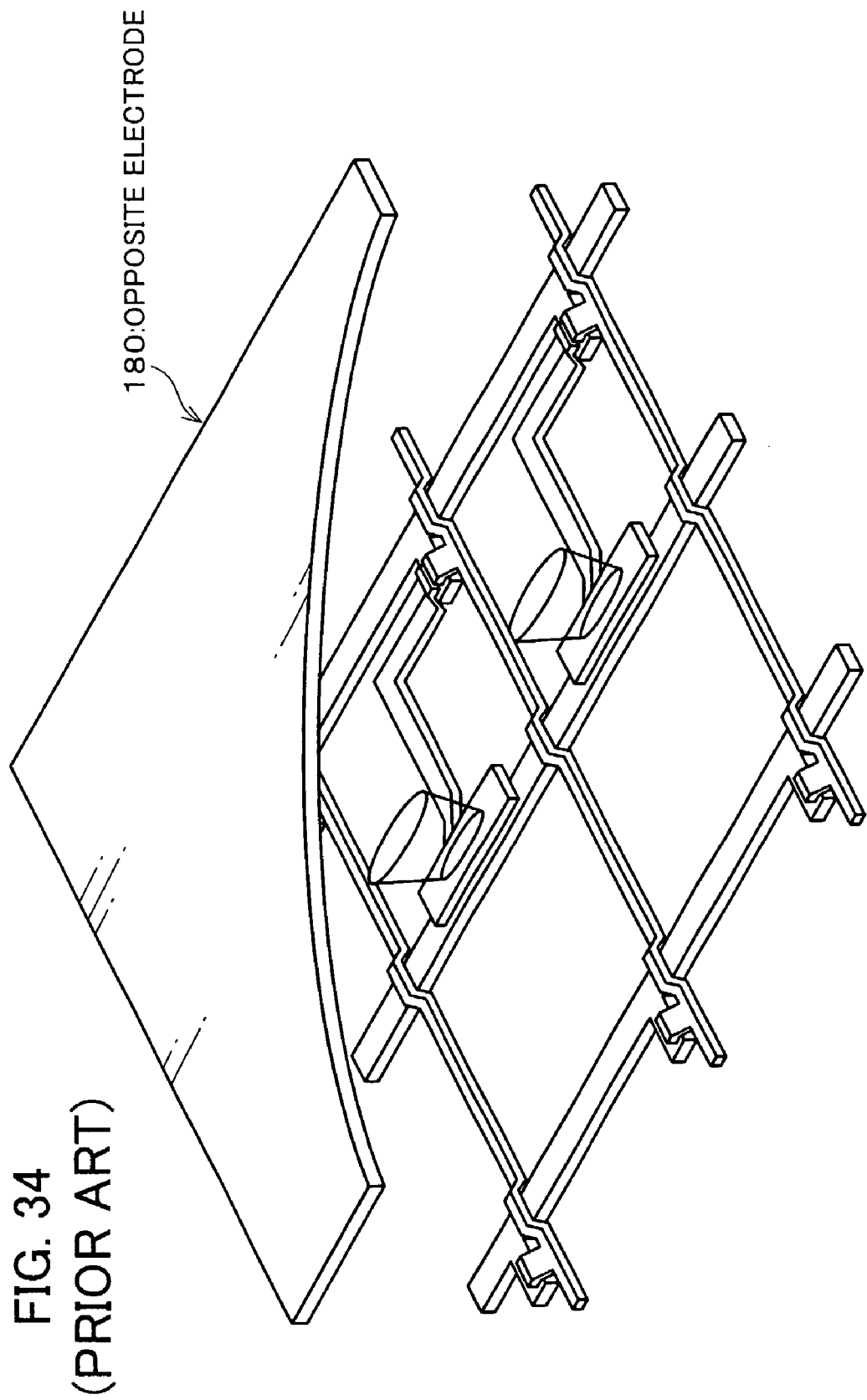
FIG. 34 is a perspective view showing, as an example, a configuration of a conventional display panel which can be used in the I/O-integrated display in FIG. 19.

FIG. 34 is an explanatory drawing illustrating a conventional arrangement of a display panel based on thin film transistors (TFTs).

If the aforementioned ultrasound stylus input scheme is used, the opposite electrode (common electrode) inside the input device 2' does not need to resemble stripes. In other words, if thin film transistors ("TFTs") are used in the input device 2', the TFTs do not necessarily have such an opposite source structure as shown in FIG. 9. In this case, a display panel is patterned can be used in which no opposite electrode 180 as shown in FIG. 34. This reduces manufacturing costs of the display panel.

The foregoing description assumes that the input device 2' is used for the I/O-integrated display 1'. Alternatively, the input device 2' is not necessarily integrated into the display. The input devices 2' may be used as a stand-alone, dedicated input tool.

The present invention is not limited to the foregoing embodiments and may be varied within the scope set forth in the claims. Technical means disclosed in different embodiments may be freely combined to provide new embodiments, and these embodiments are all regarded as within the scope of the present invention.

Features of the present invention may be described as follows:

A first set of features is the inclusion of: sensing means (styli 12, 130) for sensing a signal (coordinate recognizing signal) input to a signal electrode (panel electrode 11*c*) in a display as an information signal (detection signal) by means of capacitive coupling which occurs when a sensing tip (input tips 12*b*, 130*a*) is brought into contact with the display; detection means (code detecting section 17, code recognizing circuit 143) for producing a detection value (detection code) from the information signal output from the sensing means; conversion processing means (coordinate recognizing section 19, coordinate converter section 163') for converting the detection value to position coordinates; and position coordinate display means (display controller section 20) for producing a position coordinate display on the display based on the position coordinates, and produces a position coordinate display if the detection value by the sensing means and the detection means obtaining a code information signal (detection signal) induced in response to a code signal (input sensing signal) being fed to a signal electrode matches with a prescribed code value (input-sensing digital code) prescribed in advance.

A second set of features, as described earlier, produces a position coordinate display only if the detection value by the sensing means and the detection means obtaining a code information signal induced in response to a code signal being fed to a signal electrode matches with a prescribed code value prescribed in advance, and a switch circuit mounted to the sensing means is turned on.

A third set of features feeds a code signal to the signal electrodes during a non-display period. A fourth set of features holds the drive signals other than the code signal at a constant voltage level during a period when the code signal is fed.

An input device in accordance with the present invention includes an input receiving panel for receiving an external input and input means for enabling an input on the input receiving panel, the input device sensing an input by means of capacitive coupling between an electrode on the input receiving panel and an electrode on the input means, and to solve the problems, is arranged so as to include: first signal supply means for supplying an input sensing signal to a first one of the electrodes; signal detecting means for detecting a signal generated in the other, second electrode; and input sensing means for comparing the input sensing signal with the signal detected by the signal detecting means and sensing an input based on a result of the comparison.

Another input device in accordance with the present invention is preferably, in the input device, such that the input sensing signal represents an input-sensing digital code and that the input sensing means includes: code detecting means for detecting a digital code from the signal detected by the signal detecting means; and determining means for determining that an input has been made if the input-sensing digital code matches with the digital code detected by the code detecting means.

According to the arrangement, the input sensing signal is, for example, a pulse signal or its differential waveform, representing a digital code. In the input sensing means, the code detecting means detects a digital code from a detection signal. Further, in the input sensing means, the determining means determines that an input has been made if the digital code detected by the code detecting means matches with the digital code represented by the input sensing signal. The digital code-based determination facilitates the comparison of the input sensing signal with the detection signal and allows for simpler device structure.

Another input device in accordance with the present invention preferably, in any one of the foregoing input devices, includes: second signal supply means for supplying a coordinate recognizing signal to the first electrode; and coordinate recognizing means for recognizing coordinates of the input means on the input receiving panel based on the signal detected by the signal detecting means if the input sensing means has sensed an input.

According to the arrangement, the second signal supply means supplies a coordinate recognizing signal for input coordinate recognizing purposes to the first electrode. The second signal supply means may be provided separately from the first signal supply means or a part of the function offered by the first signal supply means.

In addition, according to the arrangement, when the input sensing means has sensed an input, the coordinate recognizing means recognizes the coordinates of the input means on the input receiving panel, for example, of the position where the input means is in contact, based on a coordinate recognizing signal component of the signal detected by the signal detecting means. Thus, coordinate recognizing operation is not unnecessarily triggered by noise, which alleviates the workload of the device.

Another input device in accordance with the present invention preferably, in any one of the foregoing input devices, such that the input means includes: an input tip which comes into contact with the input receiving panel to enable an input; and contact sensing means for sensing a contact of the input tip with an object and that the input sensing means senses an input based on the result of the comparison of the input sensing signal with the signal detected by the signal detecting means if the contact sensing means has sensed a contact of the input tip with an object.

According to the arrangement, the input tip on the input means contacts the input receiving panel when an input is made through the input means. In addition, the contact sensing means on the input means can sense a contact of the input tip with an object (in most cases, a solid). If the contact sensing means has sensed a contact of the input tip with an object, the input sensing means senses an input based on the result of the comparison of the input sensing signal with the signal detected by the signal detecting means. This allows for further reduction in the possibility of false sensing.

An I/O-integrated display in accordance with the present invention is arranged so as to include any one of the foregoing input devices and produce a display on the input receiving panel.

According to the I/O-integrated display, the input receiving panel may be fabricated separately from the display panel on which a display is produced for later integration or form a part of the display panel.

Another I/O-integrated display in accordance with the present invention is preferably, in the I/O-integrated display, such that the input receiving panel constitutes a part of a display panel on which a display is produced.

The construction of the input receiving panel as part of a display panel on which a display is produced reduces the device in weight and size (thickness) and allows for a simplified device manufacturing process. It also prevents poorer display brightness, reduces parallax due to the distance between the input means and the display panel, and prevents display quality deterioration in other ways too.

Another I/O-integrated display in accordance with the present invention is preferably, in the I/O-integrated display, such that the first signal supply means supplies the input sensing signal to the first electrode during a non-display period of the display panel.

The arrangement prevents the supply of an input sensing signal from disturbing a display.

Another I/O-integrated display in accordance with the present invention is preferably, in the I/O-integrated display, such that the display panel includes: a first substrate including: pixel electrodes arranged in rows and columns to form a matrix; switching elements each provided to a different one of the pixel electrodes; scan lines each provided in a different one of the rows and connected to all control leads of those switching elements which sit in that row; and reference lines each provided in a different one of the rows and connected to all those pixel electrodes which sit in that row through respective ones of the switching elements which sit in that row; a second substrate including signal electrodes each provided in a different one of the columns opposite to all those pixel electrodes which sit in that column; and an electro-optical layer, interposed between the first and second substrates, controlled through a potential difference between the pixel electrodes and the signal electrodes opposite to each other, wherein the signal electrodes acts as either the first electrode or the second electrode.

According to the arrangement, the display panel has a so-called "opposite source structure," and its signal electrodes can be provided as the first electrode or the second electrode, and the input receiving panel as part of the display panel.

Another I/O-integrated display in accordance with the present invention is preferably, in the I/O-integrated display, such that the first signal supply means supplies the input sensing signal to the first electrode during a non-display period of the display panel and that the reference lines are held at a constant potential during a period when the first signal supply means supplies the input sensing signal to the first electrode.

The arrangement prevents the supply of an input sensing signal from disturbing a display. By allowing no potential changes to occur on the reference lines which would be a likely cause to produce noise on the detection signal, noise is prevented from being present in the detection signal.

Another I/O-integrated display in accordance with the present invention is preferably, in the I/O-integrated display, such that the display panel includes: a first substrate including: pixel electrodes arranged in rows and columns to form a matrix; switching elements each provided to a different one of the pixel electrodes; scan lines each provided in a different one of the rows and connected to all control leads of those switching elements which sit in that row; and signal lines each provided in a different one of the columns and connected to all those pixel electrodes which sit in that column through respective ones of those switching elements which sit in that column; a second substrate including a common opposite electrode provided opposite to the pixel electrodes; and an electro-optical layer, interposed between the first and second substrates, controlled through a potential difference between the pixel electrodes and the opposite electrode opposite to each other, wherein the opposite electrode acts as either the first electrode or the second electrode.

According to the arrangement, the opposite electrode can be provided either as the first electrode or the second electrode, and the input receiving panel as part of the display panel.

Another I/O-integrated display in accordance with the present invention is preferably, in the I/O-integrated display, such that the first signal supply means supplies the input sensing signal to the first electrode during a non-display period of the display panel and that the signal lines are held at a constant potential during a period when the first signal supply means supplies the input sensing signal to the first electrode.

The arrangement prevents the supply of an input sensing signal from disturbing a display. By allowing no potential changes to occur on the signal lines which would be a likely cause to produce noise on the detection signal, noise is prevented from being present in the detection signal.

Another input device includes an input receiving panel for receiving an external input and input means for enabling an input on the input receiving panel, the input device sensing an input by means of capacitive coupling between an electrode on the input receiving panel and an electrode on the input means, and is arranged so as to include: first signal supply means for supplying an input sensing signal to a first one of the electrodes; signal detecting means for detecting a signal generated in the other, second electrode; signal generator means for generating another sensing signal which is an equivalent to the input sensing signal; and input sensing means for comparing the other sensing signal with the signal detected by the signal detecting means and sensing an input based on a result of the comparison.

Another input device in accordance with the present invention is preferably, in the input device, such that the input sensing signal and the other sensing signal represent an input-sensing digital code; and the input sensing means includes: code detecting means for detecting a digital code from the signal detected by the signal detecting means; and determining means for determining that an input has been made if the input-sensing digital code matches with the digital code detected by the code detecting means.

According to the arrangement, the input sensing signal and the other sensing signal are, for example, a pulse signal or its differential waveform, representing a digital code. In the input sensing means, the code detecting means detects a digital code from a detection signal. Further, in the input sensing means, the determining means determines that an input has been made if the digital code detected by the code detecting means matches with the digital code represented by the other sensing signal. The digital code-based determination facilitates the comparison of the other sensing signal which is an equivalent to the input sensing signal with the detection signal and allows for simpler device structure.

Another input device in accordance with the present invention preferably, in the input device, includes coordinate detecting means for detecting coordinates of the input means on the input receiving panel if the input sensing means has sensed an input.

According to the arrangement, when the input sensing means has sensed an input, the coordinate detecting means detects the coordinates of the input means on the input receiving panel, for example, of the position where the input means is in contact. Thus, coordinate recognizing operation is not unnecessarily triggered by noise, which alleviates the workload of the device.

An input device in accordance with the present invention is preferably, in the input device, such that the input means includes: an input tip which comes into contact with the input receiving panel to enable an input; and contact sensing means for sensing a contact of the input tip with an object; and the input sensing means senses an input based on the result of the comparison of the other sensing signal with the detection signal if the contact sensing means has sensed a contact of the input tip with an object.

According to the arrangement, the input tip on the input means contacts the input receiving panel when an input is made through the input means. In addition, the contact sensing means on the input means can sense a contact of the input tip with an object (in most cases, a solid). If the contact sensing means has sensed a contact of the input tip with an object, the input sensing means senses an input based on the result of the comparison of the other sensing signal which is an equivalent to an input sensing signal with the detection signal. This allows for further reduction in the possibility of false sensing.

Another I/O-integrated display in accordance with the present invention is arranged so as to include the input device and produce a display on the input receiving panel.

In the I/O-integrated display, the input receiving panel may be fabricated separately from the display panel on which a display is produced for later integration or form a part of the display panel.

Another I/O-integrated display in accordance with the present invention is preferably, in the I/O-integrated display, such that the input receiving panel constitutes a part of a display panel on which a display is produced.

The construction of the input receiving panel as part of a display panel on which a display is produced reduces the device in weight and size (thickness) and allows for a simplified device manufacturing process. It also prevents poorer display brightness, reduces parallax due to the distance between the input means and the display panel, and prevents display quality deterioration in other ways too.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An input device including an input receiving panel for receiving an external input and input means for enabling an input on the input receiving panel, the input device sensing an input by means of capacitive coupling between an electrode on the input receiving panel and an electrode on the input means, the input device comprising:
first signal supply means for supplying an input sensing signal to a first one of the electrodes;
signal detecting means for detecting a signal generated in the other, second electrode; and
input sensing means for comparing the input sensing signal with the signal detected by the signal detecting means and sensing an input based on a result of the comparison, wherein:

the input sensing signal represents an input-sensing digital code; and the input sensing means includes:

code detecting means for detecting a digital code from the signal detected by the signal detecting means; and determining means for determining that an input has been made if the input-sensing digital code matches with the digital code detected by the code detecting means.

2. The input device as set forth in claim 1, further comprising:

second signal supply means for supplying a coordinate recognizing signal to the first electrode; and coordinate recognizing means for recognizing coordinates of the input means on the input receiving panel based on the signal detected by the signal detecting means if the input sensing means has sensed an input.

3. The input device as set forth in claim 1, wherein:

the input means includes: an input tip which comes into contact with the input receiving panel to enable an input; and contact sensing means for sensing a contact of the input tip with an object; and the input sensing means senses an input based on said result if the contact sensing means has sensed a contact of the input tip with an object.

4. The input device as set forth in claim 2, wherein:

the input means includes: an input tip which comes into contact with the input receiving panel to enable an input; and contact sensing means for sensing a contact of the input tip with an object; and the input sensing means senses an input based on said result if the contact sensing means has sensed a contact of the input tip with an object.

5. An input device including an input receiving panel for receiving an external input and input means for enabling an input on the input receiving panel, the input device sensing an input by means of capacitive coupling between an electrode on the input receiving panel and an electrode on the input means, the input device comprising:

first signal supply means for supplying an input sensing signal to a first one of the electrodes;

signal detecting means for detecting a signal generated in the other, second electrode;

input sensing means for comparing the input sensing signal with the signal detected by the signal detecting means and sensing an input based on a result of the comparison;

second signal supply means for supplying a coordinate recognizing signal to the first electrode; and coordinate recognizing means for recognizing coordinates of the input means on the input receiving panel based on the signal detected by the signal detecting means if the input sensing means has sensed an input.

6. The input device as set forth in claim 5, wherein:

the input means includes: an input tip which comes into contact with the input receiving panel to enable an input; and contact sensing means for sensing a contact of the input tip with an object; and the input sensing means senses an input based on said result if the contact sensing means has sensed a contact of the input tip with an object.

7. An I/O-integrated display, comprising an input device including an input receiving panel for receiving an external input and input means for enabling an input on the input receiving panel, the input device sensing an input by means of capacitive coupling between an electrode on the input receiving panel and an electrode on the input means, the input device comprising:

first signal supply means for supplying an input sensing signal to a first one of the electrodes;

signal detecting means for detecting a signal generated in the other, second electrode; and input sensing means for comparing the input sensing signal with the signal detected by the signal detecting means and sensing an input based on a result of the comparison, wherein:

the I/O-integrated display produces a display on the input receiving panel;

the input sensing signal represents an input-sensing digital code; and the input sensing means includes:

code detecting means for detecting a digital code from the signal detected by the signal detecting means; and determining means for determining that an input has been made if the input-sensing digital code matches with the digital code detected by the code detecting means.

8. The I/O-integrated display as set forth in claim 7, further comprising:

second signal supply means for supplying a coordinate recognizing signal to the first electrode; and coordinate recognizing means for recognizing coordinates of the input means on the input receiving panel based on the signal detected by the signal detecting means if the input sensing means has sensed an input.

9. The I/O-integrated display as set forth in claim 7, wherein the input means includes: an input tip which comes into contact with the input receiving panel to enable an input; and contact sensing means for sensing a contact of the input tip with an object; and the input sensing means senses an input based on said result if the contact sensing means has sensed a contact of the input tip with an object.

10. The I/O-integrated display as set forth in claim 8, wherein the input means includes: an input tip which comes into contact with the input receiving panel to enable an input; and contact sensing means for sensing a contact of the input tip with an object; and the input sensing means senses an input based on said result if the contact sensing means has sensed a contact of the input tip with an object.

11. The I/O-integrated display as set forth in claim 7, wherein the input receiving panel constitutes a part of a display panel on which a display is produced.

12. The I/O-integrated display as set forth in claim 11, wherein the first signal supply means supplies the input sensing signal to the first electrode during a non-display period of the display panel.

13. The I/O-integrated display as set forth in claim 11, wherein:

the display panel comprises:

a first substrate including: pixel electrodes arranged in rows and columns to form a matrix; switching elements each provided to a different one of the pixel electrodes; scan lines each provided in a different one of the rows and connected to all control leads of those switching elements which sit in that row; and reference lines each provided in a different one of the rows and connected to all those pixel electrodes which sit in that row through respective ones of the switching elements which sit in that row;

a second substrate including signal electrodes each provided in a different one of the columns opposite to all those pixel electrodes which sit in that column; and an electro-optical layer, interposed between the first and second substrates, controlled through a potential difference between the pixel electrodes and the signal electrodes opposite to each other, wherein the signal electrodes act as either the first electrode or the second electrode.

14. The I/O-integrated display as set forth in claim 13, wherein:

the first signal supply means supplies the input sensing signal to the first electrode during a non-display period of the display panel; and the reference lines are held at a constant potential during a period when the first signal supply means supplies the input sensing signal to the first electrode.

15. The I/O-integrated display as set forth in claim 11, wherein:

the display panel comprises:

a first substrate including: pixel electrodes arranged in rows and columns to form a matrix; switching elements each provided to a different one of the pixel electrodes; scan lines each provided in a different one of the rows and connected to all control leads of those switching elements which sit in that row; and signal lines each provided in a different one of the columns and connected to all those pixel electrodes which sit in that column through respective ones of those switching elements which sit in that column;

a second substrate including a common opposite electrode provided opposite to the pixel electrodes; and an electro-optical layer, interposed between the first and second substrates, controlled through a potential difference between the pixel electrodes and the opposite electrode opposite to each other, wherein the opposite electrode acts as either the first electrode or the second electrode.

16. The I/O-integrated display as set forth in claim 15, wherein:

the first signal supply means supplies the input sensing signal to the first electrode during a non-display period of the display panel; and the signal lines are held at a constant potential during a period when the first signal supply means supplies the input sensing signal to the first electrode.

17. An I/O-integrated display, comprising an input device including an input receiving panel for receiving an external input and input means for enabling an input on the input receiving panel, the input device sensing an input by means of capacitive coupling between an electrode on the input receiving panel and an electrode on the input means, the input device comprising:

first signal supply means for supplying an input sensing signal to a first one of the electrodes;

signal detecting means for detecting a signal generated in the other, second electrode; and input sensing means for comparing the input sensing signal with the signal detected by the signal detecting means and sensing an input based on a result of the comparison, wherein:

the I/O-integrated display produces a display on the input receiving panel, the I/O-integrated display further comprising:

second signal supply means for supplying a coordinate recognizing signal to the first electrode; and coordinate recognizing means for recognizing coordinates of the input means on the input receiving panel based on the signal detected by the signal detecting means if the input sensing means has sensed an input.

18. The I/O-integrated display as set forth in claim 17, wherein the input means includes: an input tip which comes into contact with the input receiving panel to enable an input; and contact sensing means for sensing a contact of the input tip with an object; and the input sensing means senses an input based on said result if the contact sensing means has sensed a contact of the input tip with an object.

19. An input device including an input receiving panel for receiving an external input and input means for enabling an input on the input receiving panel, the input device sensing an input by means of capacitive coupling between an electrode on the input receiving panel and an electrode on the input means, the input device comprising:

first signal supply means for supplying an input sensing signal to a first one of the electrodes;

signal detecting means for detecting a signal generated in the other, second electrode;

signal generator means for generating another sensing signal which is an equivalent to the input sensing signal; and input sensing means for comparing the other sensing signal with the signal detected by the signal detecting means and sensing an input based on a result of the comparison.

20. The input device as set forth in claim 19, wherein the input sensing signal and the other sensing signal represent an input-sensing digital code; and the input sensing means includes: code detecting means for detecting a digital code from the signal detected by the signal detecting means; and determining means for determining that an input has been made if the input-sensing digital code matches with the digital code detected by the code detecting means.

21. The input device as set forth in claim 20, further comprising coordinate detecting means for detecting coordinates of the input means on the input receiving panel if the input sensing means has sensed an input.

22. The input device as set forth in claim 21, wherein the input means includes: an input tip which comes into contact with the input receiving panel to enable an input; and contact sensing means for sensing a contact of the input tip with an object; and the input sensing means senses an input based on said result if the contact sensing means has sensed a contact of the input tip with an object.

23. The input device as set forth in claim 19, further comprising coordinate detecting means for detecting coordinates of the input means on the input receiving panel if the input sensing means has sensed an input.

24. The input device as set forth in claim 23, wherein the input means includes: an input tip which comes into contact with the input receiving panel to enable an input; and contact sensing means for sensing a contact of the input tip with an object; and the input sensing means senses an input based on said result if the contact sensing means has sensed a contact of the input tip with an object.

25. The input device as set forth in claim 19, wherein the input means includes: an input tip which comes into contact with the input receiving panel to enable an input; and contact sensing means for sensing a contact of the input tip with an object; and the input sensing means senses an input based on said result if the contact sensing means has sensed a contact of the input tip with an object.

26. The input device as set forth in claim 20, wherein the input means includes: an input tip which comes into contact with the input receiving panel to enable an input; and contact sensing means for sensing a contact of the input tip with an object; and the input sensing means senses an input based on said result if the contact sensing means has sensed a contact of the input tip with an object.

27. The input device as set forth in claim 19, wherein: the input sensing means senses the input based on whether or not the input sensing signal and the signal being detected are identical.

28. An I/O-integrated display, comprising an input device including an input receiving panel for receiving an external input and input means for enabling an input on the input receiving panel, the input device sensing an input by means of capacitive coupling between an electrode on the input receiving panel and an electrode on the input means, the input device comprising:

first signal supply means for supplying an input sensing signal to a first one of the electrodes;

signal detecting means for detecting a signal generated in the other, second electrode;

signal generator means for generating another sensing signal which is an equivalent to the input sensing signal; and input sensing means for comparing the other sensing signal with the signal detected by the signal detecting means and sensing an input based on a result of the comparison, wherein the I/O-integrated display produces a display on the input receiving panel.

29. The I/O-integrated display as set forth in claim 28, wherein the input sensing signal and the other sensing signal represent an input-sensing digital code; and the input sensing means includes: code detecting means for detecting a digital code from the signal detected by the signal detecting means; and determining means for determining that an input has been made if the input-sensing digital code matches with the digital code detected by the code detecting means.

30. The I/O-integrated display as set forth in claim 28, further comprising coordinate detecting means for detecting coordinates of the input means on the input receiving panel if the input sensing means has sensed an input.

31. The I/O-integrated display as set forth in claim 28, wherein the input means includes: an input tip which comes into contact with the input receiving panel to enable an input; and contact sensing means for sensing a contact of the input tip with an object; and the input sensing means senses an input based on said result if the contact sensing means has sensed a contact of the input tip with an object.

32. An I/O-integrated display as set forth in claim 28, wherein the input receiving panel constitutes a part of a display panel on which a display is produced.

33. The I/O-integrated display as set forth in claim 28, wherein: the input sensing means senses the input based on whether or not the input sensing signal and the signal being detected are identical.

34. An I/O-integrated display as set forth in claim 29, wherein the input receiving panel constitutes a part of a display panel on which a display is produced.

35. The I/O-integrated display as set forth in claim 29, further comprising coordinate detecting means for detecting coordinates of the input means on the input receiving panel if the input sensing means has sensed an input.

36. The I/O-integrated display as set forth in claim 35, wherein the input means includes: an input tip which comes into contact with the input receiving panel to enable an input; and contact sensing means for sensing a contact of the input tip with an object; and the input sensing means senses an input based on said result if the contact sensing means has sensed a contact of the input tip with an object.

37. The I/O-integrated display as set forth in claim 29, wherein the input means includes: an input tip which comes into contact with the input receiving panel to enable an input; and contact sensing means for sensing a contact of the input tip with an object; and the input sensing means senses an input based on said result if the contact sensing means has sensed a contact of the input tip with an object.

38. The I/O-integrated display as set forth in claim 30, wherein the input means includes: an input tip which comes into contact with the input receiving panel to enable an input; and contact sensing means for sensing a contact of the input tip with an object; and the input sensing means senses an input based on said result if the contact sensing means has sensed a contact of the input tip with an object.

* * * * *